US011620099B1

(12) United States Patent
Gerhardt et al.

(10) Patent No.: US 11,620,099 B1
(45) Date of Patent: Apr. 4, 2023

(54) SYSTEM AND METHOD FOR CONFIGURING A DISPLAY SYSTEM TO COLOR MATCH DISPLAYS

(71) Applicant: Faurecia IRYStec, Inc., Montreal (CA)

(72) Inventors: Jeremie Gerhardt, Montréal (CA); Hyunjin Yoo, North Lancaster (CA); Tara Akhavan, Kirkland (CA); Gregory Ward, Berkeley, CA (US)

(73) Assignee: Faurecia IRYStec Inc., Montreal (CA)

( * ) Notice: Subject to any disclaimer, the term of this patent is extended or adjusted under 35 U.S.C. 154(b) by 0 days.

(21) Appl. No.: 17/827,426

(22) Filed: May 27, 2022

(51) Int. Cl.
  *G06F 3/14* (2006.01)
  *G09G 3/20* (2006.01)
  *G01J 3/46* (2006.01)

(52) U.S. Cl.
  CPC .......... *G06F 3/1423* (2013.01); *G01J 3/463* (2013.01); *G09G 3/2007* (2013.01); *G09G 2320/0666* (2013.01); *G09G 2320/08* (2013.01); *G09G 2340/06* (2013.01); *G09G 2380/10* (2013.01)

(58) Field of Classification Search
  CPC ............. G09G 1/285; G09G 5/395; G09G 2320/0285; G09G 5/393; H04N 9/73; G06F 3/1446
  See application file for complete search history.

(56) References Cited

U.S. PATENT DOCUMENTS

| | | | |
|---|---|---|---|
| 9,542,876 B2 | 1/2017 | Wu et al. | |
| 10,332,437 B2 | 6/2019 | Orio et al. | |
| 10,657,870 B2 | 5/2020 | Orio et al. | |
| 2002/0122044 A1* | 9/2002 | Deering | G06F 3/1431 |
| | | | 348/E9.051 |
| 2003/0193565 A1* | 10/2003 | Wen | H04N 17/04 |
| | | | 348/E17.005 |
| 2005/0105608 A1* | 5/2005 | Coleman | H04N 21/4143 |
| | | | 375/240.01 |

(Continued)

FOREIGN PATENT DOCUMENTS

| | | |
|---|---|---|
| CN | 1543227 A | 11/2004 |
| CN | 101895771 A | 11/2010 |

(Continued)

*Primary Examiner* — Shaheda A Abdin
(74) *Attorney, Agent, or Firm* — Reising Ethington P.C.

(57) ABSTRACT

A system and method is provided for color matching two or more electronic displays of a display system. The method includes: obtaining first and second spectral response readings for first and second electronic displays from spectral response device(s); determining first and second spectral response curves based on the first and second spectral response readings; determining first and second spectral power distributions based on the first and second spectral response readings; determining a first device-to-independent color mapping based on the first spectral response curve and the first spectral power distribution; determining a second device-to-independent color mapping based on the second spectral response curve and the second spectral power distribution; and configuring a display system having the first electronic display and the second electronic display to match colors being displayed based on using the first device-to-independent color mapping and the second device-to-independent color mapping.

19 Claims, 8 Drawing Sheets

(56) References Cited

U.S. PATENT DOCUMENTS

| | | | | |
|---|---|---|---|---|
| 2006/0227085 A1* | 10/2006 | Boldt, Jr. | ............... | G01J 3/506 348/E17.005 |
| 2007/0146268 A1* | 6/2007 | Jeong | .................. | G09G 3/3607 345/88 |
| 2013/0155120 A1 | 6/2013 | Kang | | |
| 2018/0181365 A1* | 6/2018 | Winton | ................... | H03G 3/32 |

FOREIGN PATENT DOCUMENTS

| | | |
|---|---|---|
| CN | 108288026 A | 7/2018 |
| JP | 2003241732 A | 8/2003 |
| JP | 2006166237 A | 6/2006 |
| JP | 6851082 B2 | 3/2021 |
| WO | 2020216964 A1 | 10/2020 |

\* cited by examiner

SYSTEM AND METHOD FOR CONFIGURING A DISPLAY SYSTEM TO COLOR MATCH DISPLAYS

TECHNICAL FIELD

This disclosure relates to methods and systems for matching colors generated by displays of a display system.

BACKGROUND

Nowadays, certain display systems, such as those used in automotive cockpits, may include a display system that combines several color display devices (or "electronic displays") of different technologies, and this can introduce undesirable color differences among the actual outputted or perceived outputs. The term "electronic display" as used herein refers to any electronic device that provides a visible light output and that is capable of varying outputted color, such as through outputting varying levels of primary colors using an RGB-controllable light source (e.g., light emitting diode (LED)), for example. An electronic display could be any of a number of different devices including display monitors (such as television displays and computer monitors, which may be liquid crystal displays (LCDs), light emitting diode (LED) based displays (e.g., organic LED (OLED), LED LCD), or other suitable image display device), projectors (e.g., LCD projectors, digital light processing (DLP) projectors) ambient or diffuse light sources (which may use LEDs or other light source technology), and/or arrays or individual lights, such as LED arrays, LED strings, etc. In this sense, both an OLED high-resolution television screen and a device that includes a single LED used for producing visible light are considered electronic displays. Some conventional multi-display systems may rely on using the same or a like (e.g., RGB-based) color space for the displays of the display system, but even in such cases the colors often appear different among the different displays (especially when they are different models or different technologies). Even when two electronic displays are specified as operating according to a supposedly-standard color space, such as sRGB, the actual colors produced by the displays often differ and, in this sense, each display is considered as having its own device-specific color space.

The is a needed a solution that addresses such discrepancies in color output and, preferably, that is more robust to change of luminance and display brightness and/or that adapts better to matching electronic displays of different technologies. The terms "different technology" and "different technologies" when used in a context referring to electronic displays means that the electronic displays are of a different type of device (e.g., a computer monitor for versus a LED light strip) and/or that the electronic displays use a different principle for generating light of a particular color or perception—for example, an OLED monitor and an LCD monitor are different technologies in this sense. There is also needed a solution for configuring and/or provisioning display systems with such color matching technology in an efficient manner, such as for purposes of manufacturing and configuring display systems for automobiles.

SUMMARY

According to one aspect of the disclosure, there is provided a method for color matching two or more electronic displays of a display system. The method includes: obtaining first spectral response readings for a first electronic display and second spectral response readings for a second electronic display from one or more spectral response devices; determining a first spectral response curve based on the first spectral response readings and a second spectral response curve based on the second spectral response readings; determining a first spectral power distribution based on the first spectral response readings and a second spectral power distribution based on the second spectral response readings; determining a first device-to-independent color mapping that represents a mapping between the first color space and an independent color space, wherein the first device-to-independent color mapping is determined based on the first spectral response curve and the first spectral power distribution; determining a second device-to-independent color mapping that represents a mapping between the second color space and the independent color space, wherein the second device-to-independent color mapping is determined based on the second spectral response curve and the second spectral power distribution; and configuring a display system having the first electronic display and the second electronic display to match colors being displayed based on using the first device-to-independent color mapping and the second device-to-independent color mapping.

According to various embodiments, the method may further include any one of the following features or any technically-feasible combination of some or all of the following features:
  the first spectral response readings for the first electronic display and the second spectral response readings for the second electronic display are obtained from the one or more spectral response devices through use of a grayscale ramping technique that includes an iterative process having N iterations, where, for each iteration n of the total N iterations, the iterative process includes:
    displaying an image represented by a digital grayscale input $i_n$ at a respective display, and
    obtaining a spectral response reading using at least one of the spectral response devices,
  wherein, for a next iteration n+1, the digital grayscale input $i_{n+1}$ is obtained by increasing or decreasing input values evenly for each channel of a color set corresponding to the respective electronic display relative to those input values used for the digital grayscale input $i_n$ for the current iteration n, wherein the first spectral response readings are obtained using the iterative process where the respective display is the first electronic display and the second spectral response readings are obtained using the iterative process where the respective display is the second electronic display;
  the first spectral response curve and the second spectral response curve are determined by obtaining a relationship between relative luminance as indicated by the spectral response readings and the digital grayscale inputs used by the respective display for generating the images for which the spectral response readings are obtained;
  the first spectral power distribution and the second spectral power distribution are determined by obtaining a relationship between emitted power and wavelength based on the spectral response readings;
  the first spectral power distribution is obtained using a grayscale ramping technique in which the first spectral response readings are obtained by the one or more spectral response devices;
  the configuring step includes storing color mapping information in memory of the display system, wherein the color mapping information is generated based on the determined first device-to-independent color mapping and the determined second device-to-independent color mapping;

the color mapping information is configured for color matching a display input to be display on the first electronic display as a reference display so that a color matching display input is generated for display on the second electronic display as a matching display;

the display system is configured with a color matching function that is configured to produce the color matching display input based on using the color mapping information and a color input that is a part of a display input;

the configuring step includes storing a plurality of color mapping information entries in memory of the display system, wherein each of the color mapping information entries is generated based on the determined first device-to-independent color mapping, and wherein at least one of the color mapping information entries is generated based on the determined second device-to-independent color mapping;

the display system includes a third electronic display, and wherein at least one of the color mapping information entries is generated based on color mappings other than the determined second device-to-independent color mapping;

the display system is configured to color match the second electronic display with a first color matching sub-portion of a display input for the first electronic display and to color match the third electronic display with a second color matching sub-portion of the display input for the first electronic display;

the first color matching sub-portion is color matched to the second electronic display by using a color matching function where color mapping information for the second electronic display and for the first electronic display is used by the color matching function to generate a color matched display input that is to be passed to the first electronic display for display; and/or the configuring step includes storing, into memory of the display system, a first data structure representing the first device-to-independent color mapping and/or the second device-to-independent color mapping.

According to another aspect of the disclosure, there is provided a display system that includes at least one processor and memory storing computer instructions accessible by the at least one processor. The at least one processor, when executing the computer instructions, causes the display system to carry out a process for color matching two or more electronic displays of a display system, wherein the process includes: receiving a display input; applying color matching to the display input using color mapping information to obtain a color matched display input; and causing the color matched display input to be displayed at a matching display. The color mapping information is obtained by a display configuration process that includes: obtaining first spectral response readings for a first electronic display and second spectral response readings for a second electronic display from one or more spectral response devices; determining a first spectral response curve based on the first spectral response readings and a second spectral response curve based on the second spectral response readings; determining a first spectral power distribution based on the first spectral response readings and a second spectral power distribution based on the second spectral response readings; determining a first device-to-independent color mapping that represents a mapping between the first color space and an independent color space, wherein the first device-to-independent color mapping is determined based on the first spectral response curve and the first spectral power distribution; determining a second device-to-independent color mapping that represents a mapping between the second color space and the independent color space, wherein the second device-to-independent color mapping is determined based on the second spectral response curve and the second spectral power distribution; and configuring a display system with the color mapping information so as to match colors being displayed, wherein the color mapping information is based on the first device-to-independent color mapping and the second device-to-independent color mapping.

According to various embodiments, the display system may further include any one of the following features or any technically-feasible combination of some or all of the following features:

further comprising the first electronic display and the second electronic display, and wherein the first electronic display is a reference display and the second electronic display is the matching display;

the display system is an in-vehicle display system;

the display system is configured to operate a plurality of displays, and wherein at least two of the displays are different technologies;

the first electronic display is a display monitor and the second electronic display is a non-resolute display; and/or the in-vehicle display system is configured to obtain updated color mapping information from a backend server.

According to another aspect of the disclosure, there is provided method for color matching two or more electronic displays of a display system. The method includes obtaining first spectral response readings for a first electronic display from one or more spectral response devices, wherein the first spectral response readings for the first electronic display are obtained from the one or more spectral response devices through use of a grayscale ramping technique; determining a first spectral response curve based on the first spectral response readings; determining a first spectral power distribution based on the first spectral response readings; determining a first device-to-independent color mapping that represents a mapping between the first color space and an independent color space, wherein the first device-to-independent color mapping is determined based on the first spectral response curve and the first spectral power distribution; and configuring a display system having the first electronic display to match colors being displayed based on using the first device-to-independent color mapping. The grayscale ramping technique that includes an iterative process having N iterations, where, for each iteration n of the total N iterations, the iterative process includes: displaying an image represented by a digital grayscale input in at the first electronic display, and obtaining a spectral response reading using at least one of the spectral response devices, wherein, for a next iteration n+1, the digital grayscale input $i_{n+1}$ is obtained by increasing or decreasing input values evenly for each channel of a color set corresponding to the first electronic display relative to those input values used for the digital grayscale input in for the current iteration n.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
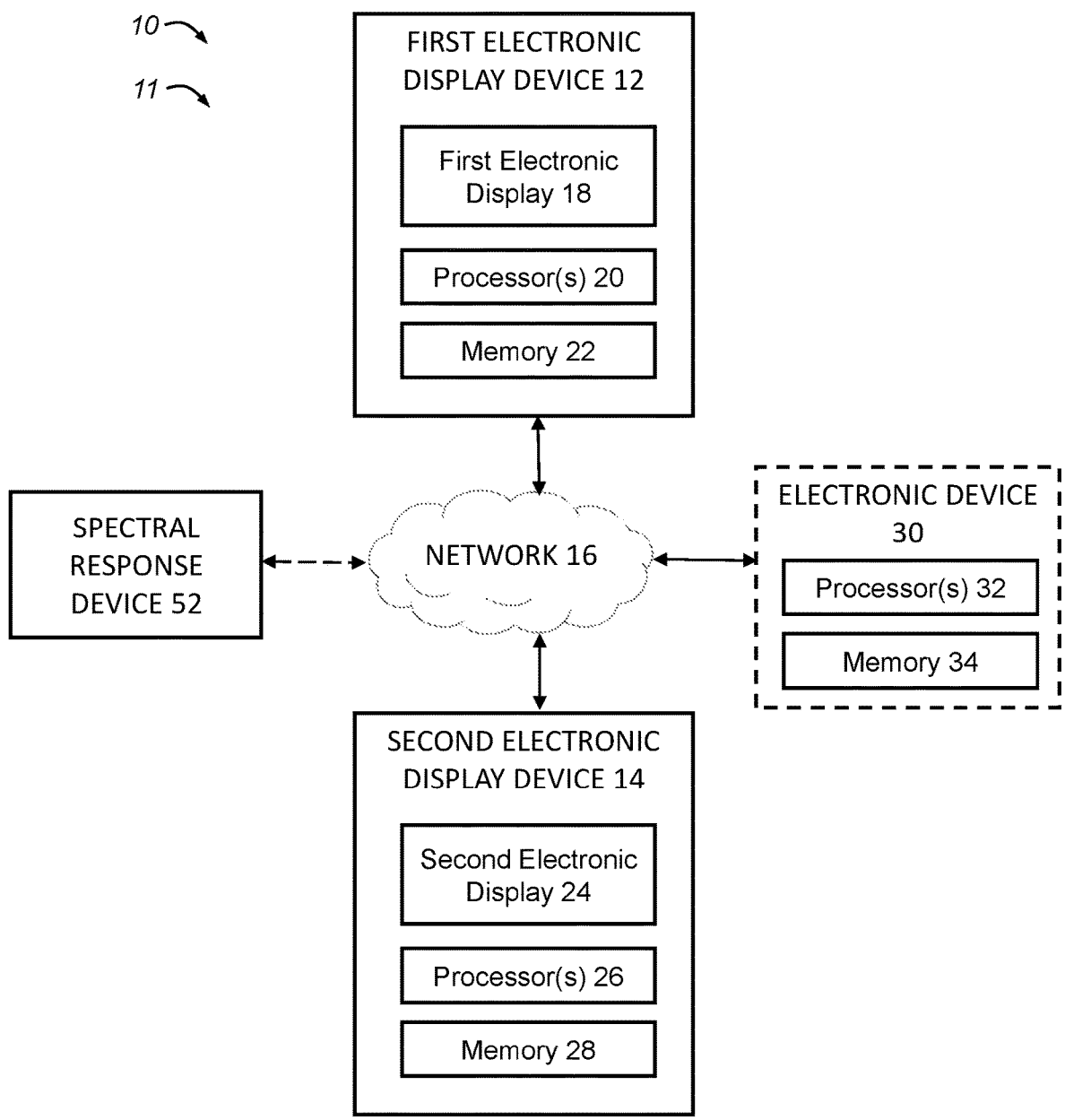
FIG. 1 is a diagrammatic view of an operating environment that includes a display system and a display configuration system that may be used to carry out one or more of the methods described herein, according to one embodiment.

A system and method for color matching two or more electronic displays of a display system such that, for example, when an input image is displayed on the electronic displays, the emitted or actual color output (i.e., the actual color emitted from the displays) matches or is the same (within an allowable tolerance range). The emitted color output (or spectral response) of a first electronic display and a second electronic display may be measured to determine display characteristics, such as a response curve and spectral power distribution (SPD). The display characteristics of the first electronic display are then used to determine a first device-to-independent color mapping that represents a mapping of a first color space to an independent color space and, in at least some embodiments, the first color space is a device-specific color space of the first electronic display. The display characteristics of the second electronic display are used to determine a second device-to-independent color mapping that represents a mapping of a second color space to an independent color space and, in at least some embodiments, the second color space is a device-specific color space of the second electronic display. A display system that includes the first electronic display and the second electronic display is configured to match colors being displayed on the first electronic display and the second electronic display based on the first device-to-independent color mapping and the second device-to-independent color mapping.

The display system, which may include the first electronic display and the second electronic display, is configured to match colors being displayed on the first electronic display and the second electronic display, which includes using the first device-to-independent color mapping and the second device-to-independent color mapping. The display system is thus configured so that, when an input image is displayed by the first electronic display as a first displayed image and by the second electronic display as a second displayed image, an emitted color output of the first displayed image matches an emitted color output the second displayed image. The display system may be configured by a display configuration system, which is used to carry out one or more methods described herein that are used for configuring a display system. The display configuration system includes one or more processors and memory storing computer instructions that, when executed by the one or more processors, cause the method(s) described herein to be carried out.

According to at least some embodiments, a method is provided that is for color matching two or more electronic displays of a display system. The method may be carried out by the display configuration system. The method includes obtaining first spectral response readings for a first electronic display and second spectral response readings for a second electronic display from one or more spectral response devices; determining a first spectral response curve based on the first spectral response readings and a second spectral response curve based on the second spectral response readings, wherein the first spectral response curve and the second spectral response curve are determined by obtaining a relationship between relative luminance as indicated by the spectral response readings and the digital grayscale inputs used by the respective display for generating the images for which the spectral response readings are obtained; determining a first spectral power distribution based on the first spectral response readings and a second spectral power distribution based on the second spectral response readings, wherein the first spectral power distribution and the second spectral power distribution are determined by obtaining a relationship between emitted power and wavelength based on the spectral response readings; determining a first device-to-independent color mapping that represents a mapping between the first color space and an independent color space, wherein the first device-to-independent color mapping is determined based on the first spectral response curve and the first spectral power distribution; determining a second device-to-independent color mapping that represents a mapping between the second color space and the independent color space, wherein the second device-to-independent color mapping is determined based on the second spectral response curve and the second spectral power distribution; and configuring a display system having the first electronic display and the second electronic display to match colors being displayed based on using the first device-to-independent color mapping and the second device-to-independent color mapping.

According to at least one embodiment, the first spectral response readings and the second spectral response readings are obtained using a grayscale ramping technique that includes an iterative process having N iterations, where, for each iteration n of the total N iterations, the process includes: displaying an image represented by a digital grayscale input $i_n$ at on a respective display, and obtaining a spectral response reading using at least one of the spectral response devices. For a next iteration n+1, the digital grayscale input $i_{n+1}$ is obtained by increasing or decreasing input values evenly for each channel of a color space corresponding to the respective electronic display relative to those input values used for the digital grayscale input in for the current iteration n. The first spectral response readings are obtained using the iterative process where the respective display is the first electronic display and the second spectral response readings are obtained using the iterative process where the respective display is the second electronic display. The spectral response readings may be stored as they are obtained, after a certain number of iterations, after the iterative process (after all N iterations) for the respective display and before starting the iterative process for another respective display.

In one embodiment, the display system is a part (or is to be part) of vehicle electronics of a vehicle, such as a passenger automobile, and is considered an in-vehicle display system. In one embodiment, the in-vehicle display system includes a first electronic display that is an OLED 15" monitor and a second electronic display is an LED array that includes a matrix (or rectangular array) of LED elements, for example. According to one embodiment, the in-vehicle display system is configured by a display configuration system using the method(s) described herein and the in-vehicle display system further includes display configuration information that is used to color match the first electronic display and the second electronic display. The display configuration information may be specified as color mapping information and may include or be based on the first device-to-independent color mapping for the first electronic display and the second device-to-independent color mapping for the second electronic display. The display configuration information may be represented by one or more values or functions that are stored in memory of the in-vehicle display system and that may be used by the in-vehicle display system when outputting light using the first electronic display and/or the second electronic display.

In some embodiments, the in-vehicle display system may selectively use the display configuration information to match the first electronic display and the second electronic display. This may be useful when, for example, the in-vehicle display system includes more than two displays, such as a third electronic display. In some embodiments, such as where the display system includes the third electronic display, the display system may store display configuration information for each pairing of displays—i.e., the first and second display pairing is represented by first-second display configuration information, the second and third display pairing is represented by first-third display configuration information, and the second and third display pairing is represented by second-third display configuration information. The display system may thus be configured to selectively use or apply corresponding display configuration information based on operation of the display system, such as whether certain displays are active and/or are to be color matched. In some embodiments, more than two displays may be "paired" (or grouped) together and represented by display configuration information that is used to match colors of all of the displays.

With reference to FIG. 1, there is shown a display system 10 having a first electronic display device 12, a second electronic display device 14, and a network 16 that represents a computer network that is operatively connected to the first electronic display device 12 and the second electronic display device 14. FIG. 1 also depicts an electronic device 30 and a spectral response device 52, which is not considered a part of the display system 10, but may be used as a part of a display color matching measurement system (or display configuration system) that is used to configure the display system 10 based on information obtained from the spectral response device 52. The first electronic display device 12 has an electronic display (referred to as the first electronic display) 18, at least one processor 20, and memory 22. The second electronic display device 14 has an electronic display (referred to as the second electronic display) 24, at least one processor 26, and memory 28. The display system 10 includes the electronic device 30 that is separate from the first electronic display device 12 and the second electronic display device 14, and that includes at least one processor 32 and memory 34. In some embodiments, the display system 10 does not include the network 16 and/or the electronic device 30. For example, the first electronic display device 12 and the second electronic display device 14 may be color matched using the method discussed herein, and then one or both of the first electronic display device 12 and the second electronic display device 14 is configured according to the determined color matching, which may be based on a first device-to-independent mapping and on a second device-to-independent mapping.

The first electronic display device 12 and the second electronic display 14 each is an electronic display device, which is an electronic device that includes an electronic display that outputs visible light such as to produce ambient light and/or to display images, such as graphics, pictures, videos, etc. The first electronic display device 12 includes the first electronic display 18 and the second electronic display device 14 includes the second electronic display 24, and each of these is an electronic display, such as an LED array, an LED string, a single LED device, an organic light emitting diode (OLED) display, a liquid crystal display (LCD), an LCD projector, etc. In at least some embodiments, the first electronic display 18 and the second electronic display 24 are different models of displays and the emitted color output of each of these displays 18, 24 may differ from one another even when displaying the same input image; however, as described herein, the color matching process seeks to match the emitted color output of each of these displays 18, 24. Moreover, the color matching discussed herein may be applied to match colors of two displays that are of the same model, at least according to some embodiments. The first electronic display device 12 includes at least one processor 20 and memory 22 and the second electronic display device 14 includes at least one processor 26 and memory 28.

As mentioned above, the network 16 represents a computer network that is operatively connected to the first electronic display device 12 and the second electronic display device 14, and may be implemented as a variety of different networking and computer componentry. For example, the network 16 could be a local area network (LAN) or could be implemented using a controller area network (CAN) bus. Of course, other network techniques and hardware may be used as these are just examples. The dashed line between the spectral response device 52 and the network 16 represents that the spectral response device 52 may be optionally connected to a network that the display system 10 is connected to. This may be used during the method 300 (FIG. 6), for example, when display configuration information is determined for the first electronic display and the second electronic display. In other embodiments, the spectral response readings or data may be obtained and used by an operator or other system that then prepares the display configuration information and incorporates this information into the display system. However, in one embodiment, one or more processors may be used to generate display configuration information, such as using the methods discussed herein, and to then configure the display system 10 using this display configuration information. This may be carried out automatically and thus may be used to streamline color matching of various displays to one another.

The spectral response device 52 is shown as a single device; however, it should be appreciated that more than one spectral response device could be used. The spectral response device 52 may be a spectrophotometer or colorimeter. An example of a spectrophotometer that may be used is a i1Display Pro™ from X-Rite™; however, it should be appreciated that various other spectral response devices may be used. In the case of using a colorimeter, the colorimeter may be calibrated or profiled for measurement with the respective electronic display that the colorimeter is measuring. This calibration information may be determined using a spectrophotometer or selecting predefined calibration information, such as those compiled in Argyll Color Management System (ArgyllCMS). In at least some embodiments, the same spectral response device 52 is used to measure spectral response readings from the first electronic display 18 and the second electronic display 24. Although a single spectral response device 52 is shown and described, it should be appreciated that any number of spectral response devices may be used for obtain spectral response data from the display(s) and that the descriptions herein apply equally to these other spectral response devices as they do to the spectral response device 52. Also, although the display system 10 is shown and described as including two displays, the display system 10 may include any number of displays and it should further be appreciated that the method and descriptions herein apply equally to these other displays as they do to the first electronic display and the second electronic display.

FIG. 1 also depicts a display configuration system 11, which includes at least one processor and memory storing computer instructions, and the spectral response device 52. In some embodiments, the display configuration system 11 includes two or more spectral response devices. In one embodiment, the display configuration system 11 includes the electronic device 30, which may be a personal computer that is used by an operator to assist with and/or partially carry out portions of the display configuration method(s) described herein. In some embodiments, the at least one processor and memory of the display configuration system 11 includes the processor(s) 20, the processor(s) 26, and/or the processor(s) 32 and/or the memory 22, the memory 28, and/or the memory 34.

Figure 2:
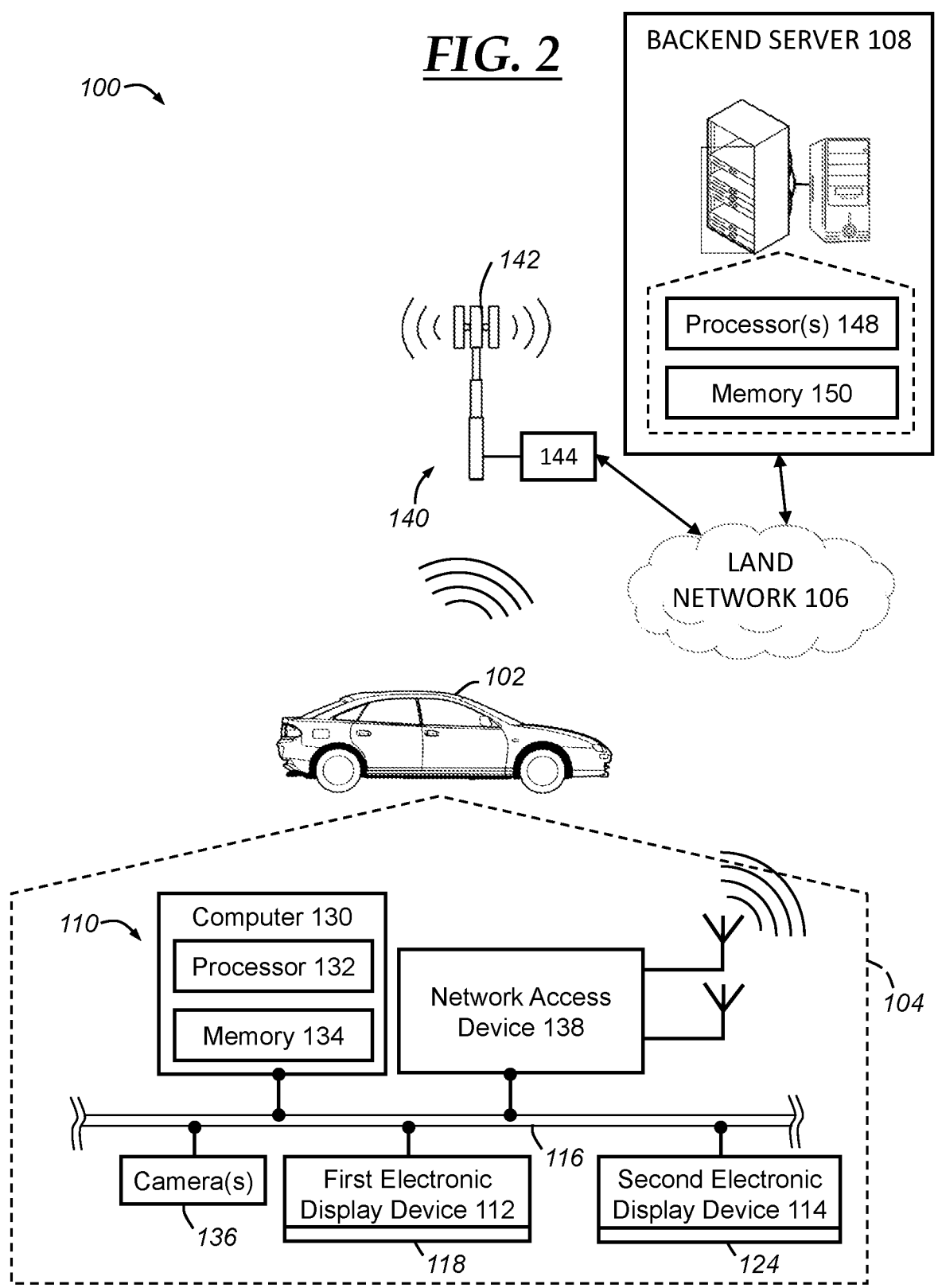
FIG. 2 is a diagrammatic view of a communications system that includes an in-vehicle display system that is configured by a display configuration system, such as the display configuration system of FIG. 1, according to one embodiment.

With reference to FIG. 2, there is shown an operating environment that comprises a communications system 100, a vehicle 102 having vehicle electronics 104 including a display system 110 including a first electronic display 118 and a second electronic display 124, a land network 106, one or more backend servers 108, and a wireless carrier system 140. It should be appreciated that while the display system 110 is discussed in the context of a vehicular application as an in-vehicle display system, the display system 10 may be used as a part of a variety of other applications or contexts, such as where the display system 10 is incorporated into a system having a handheld mobile device (e.g., smartphone), a personal computer (e.g., laptop, desktop computer), and/or a cloud processing system.

The land network 106 and the wireless carrier system 140 provide an exemplary long-range communication connection between the vehicle 102 and the backend server(s) 108, for example. Either or both of the land network 106 and the wireless carrier system 140 may be used by the vehicle 102, the backend server(s) 108, or other component for long-range communications. The land network 106 may be a conventional land-based telecommunications network that is connected to one or more landline telephones and connects the wireless carrier system 140 to the backend server(s) 108. For example, the land network 106 may include a public switched telephone network (PSTN) such as that used to provide hardwired telephony, packet-switched data communications, and the Internet infrastructure. One or more segments of the land network 106 may be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 140 may be any suitable long-range data transmission system, such as a cellular telephone system. The wireless carrier system 140 is shown as including a single cellular tower 142; however, the wireless carrier system 140 may include additional cellular towers as well as one or more of the following components, which may depend on the cellular technology being used: base transceiver stations, mobile switching centers, base station controllers, evolved nodes (e.g., eNodeBs), mobility management entities (MMEs), serving and PGN gateways, etc., as well as any other networking components used to connect the wireless carrier system 140 with the land network 106 or to connect the wireless carrier system 140 with user equipment (UEs, e.g., which may include telematics equipment in the vehicle 102), all of which is indicated generally at 144. The wireless carrier system 140 may implement any suitable communications technology, including for example GSM/GPRS technology, CDMA or CDMA2000 technology, LTE technology, 5G, etc. In at least one embodiment, the wireless carrier system 140 implements 5G cellular communication technology and includes suitable hardware and configuration. In some such embodiments, the wireless carrier system 140 provides a 5G network usable by the vehicle 102 for communicating with the backend server(s) 108 or other computer/device remotely located from the vehicle 102. In general, the wireless carrier system 140, its components, the arrangement of its components, the interaction between the components, etc. is generally known in the art.

Figure 3:
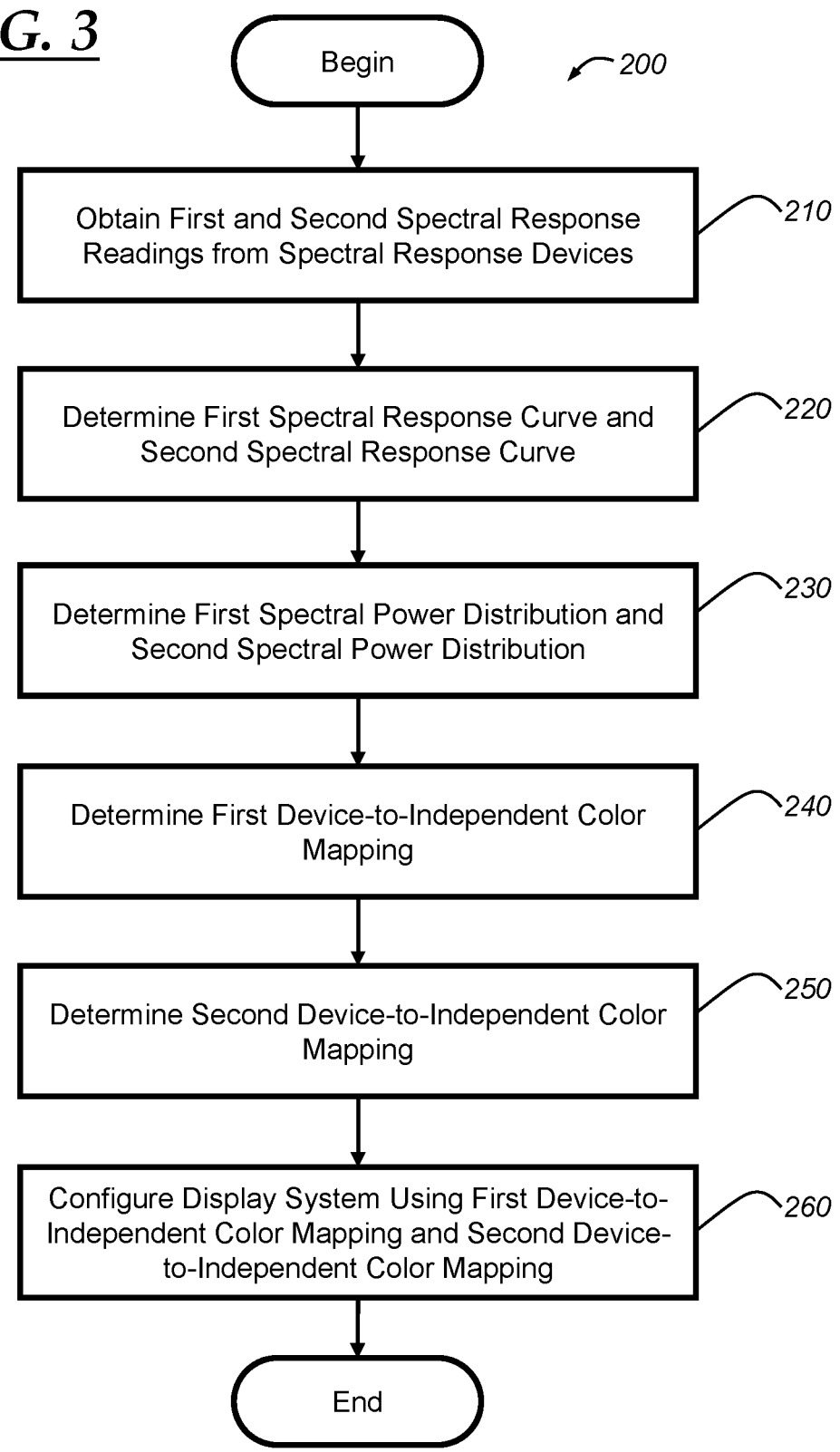
FIG. 3 shows a flowchart depicting a method for color matching two or more electronic displays of a display system, according to one embodiment.

The one or more backend servers (or backend server(s)) 108 may be used to provide a backend for the vehicle 102, display system 110, and/or other components of the system 100. In at least one embodiment, the backend server(s) 108 includes one or more computers or computing devices (collectively, "computers") that are configured to carry out one or more steps of the methods described herein, such as the method 200 (FIG. 3). In another embodiment, the backend server(s) 108 are used to store information concerning and/or pertaining to the vehicle 102 or display system 110, such as predetermined graphics (or other images) and/or predetermined properties or information, such as the display configuration information determined using the method 200 (FIG. 3) and/or that relating to one or more color spaces that may be used as an independent color space in the color matching process discussed below in the method 200 (FIG. 3). The backend server(s) 108 may be implemented or hosted by one or more computers, each of which includes a processor and a non-transitory, computer-readable memory that is accessible by the processor.

The backend server(s) 108 are shown as including one or more processors 148 and non-transitory, computer-readable memory 150. In one embodiment, the backend server(s) 108 may make up the display configuration system 11 that is used to carry out one or more steps of one or more methods described herein, such as the method 200 (FIG. 3). In such embodiments, the backend server(s) 108 may be configured so that, when computer instructions stored on the memory 150 are executed by the processor(s) 148, the backend server(s) 108 causes certain steps and/or functionality to be carried out, such as any of the functionality attributed to the backend server(s) 108 as discussed herein. In one embodiment, the processor(s) 148 and the memory 150 storing the computer instructions may form a display system that is configured to carry out one or more steps of one or more methods described below.

The vehicle 102 is depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. As depicted in the illustrated embodiment, the vehicle 102 includes the vehicle electronics 104, which include a first electronic display device 112 having the first electronic display 118, a second electronic display device 114 having the second electronic display 124, a vehicle communications bus 116, an onboard vehicle computer 130, one or more cameras 136, and a network access device 138. FIG. 2 provides an example of certain components of the vehicle electronics 104, however, it should be appreciated that, according to various embodiments, the vehicle electronics 104 may include one or more other components in addition to or in lieu of those components depicted in FIG. 2.

The one or more cameras 136 are each used to obtain image data of the vehicle's environment, and the image data, which represents an image captured by the camera(s) 136, may be represented as an array of pixels that specify color information, which may be represented by a collection of RGB triplets when using an RGB-based color space, for example. The camera(s) 136 may each be any suitable digital camera or image sensor, such as a complementary metal—oxide—semiconductor (CMOS) camera/sensor. The camera(s) 136 are each connected to the vehicle communications bus 116 and may provide image data to the onboard vehicle computer 130. In some embodiments, image data from one or more of the camera(s) 136 is provided to the backend server(s) 108. The camera(s) 136 may be mounted so as to view various portions within or surrounding the vehicle.

The network access device 138 is used by the vehicle 102 to access network(s) that are external to the vehicle 102, such as a home Wi-Fi™ network of a vehicle operator or one or more networks of the backend server(s) 108. The network access device 138 includes a short-range wireless communications (SRWC) circuit (not shown) and a cellular chipset (not shown) that are used for wireless communications. The SRWC circuit includes an antenna and is configured to carry out one or more SRWC technologies, such as any one or more of the IEEE 802.11 protocols (e.g., IEEE 802.11p, Wi-Fi™), WiMAX™, ZigBee™, Z-Wave™, Wi-Fi direct™, Bluetooth™ (e.g., Bluetooth™ Low Energy (BLE)), and/or near field communication (NFC). The cellular chipset includes an antenna and is used for carrying out cellular communications or long-range radio communications with the wireless carrier system 140, such as for purposes of carrying out communications between the vehicle 102 and one or more remote devices/computers, such as those implementing the backend server(s) 108.

The first electronic display device 112 includes the first electronic display 118 and the second electronic display device 114 includes the second electronic display 124. Each of the first electronic display 118 and the second electronic display 124 is an electronic display that is used to output visible light, such as to provide ambient illumination and/or display images, such as graphics and/or pictures. The first electronic display 118 and the second electronic display 124 may be any of a variety of electronic displays, including, for example: a LCD or an OLED monitor that displays high-resolution images; a single LED; a LED or light string; a light array (e.g., a 5 by 10 array of LED lights); incandescent or halogen light(s); etc. According to some embodiments, the first electronic display 118 is a reference display for use in the methods discussed herein; according to other embodiments, the second electronic display 124 is a reference display for use in the methods discussed herein; and, in some embodiments, a user of the vehicle 102 may select which display to use as the reference display, such as through use of a graphic user interface that is presented on a touchscreen of an infotainment unit of the vehicle 102. The reference display is a display selected from a plurality of displays of the display system and is used as setting the basis for perception of the perceived color output; that is, the display configuration information (or color mappings, which are determined using the method(s) (e.g., the method 200)) is used by the display system to match outputted color of the other electronic display(s) of the display system (the display(s) of the display system that are not the reference display) to the reference display so that for a given color input, the input that is used by the other electronic display(s) (the matching display(s)) is modified using the color mapping (or the display configuration information) so that the outputted visible light of the matching display(s) is the same as that (or closely matched to) the outputted visible light of the reference display.

Figure 8:
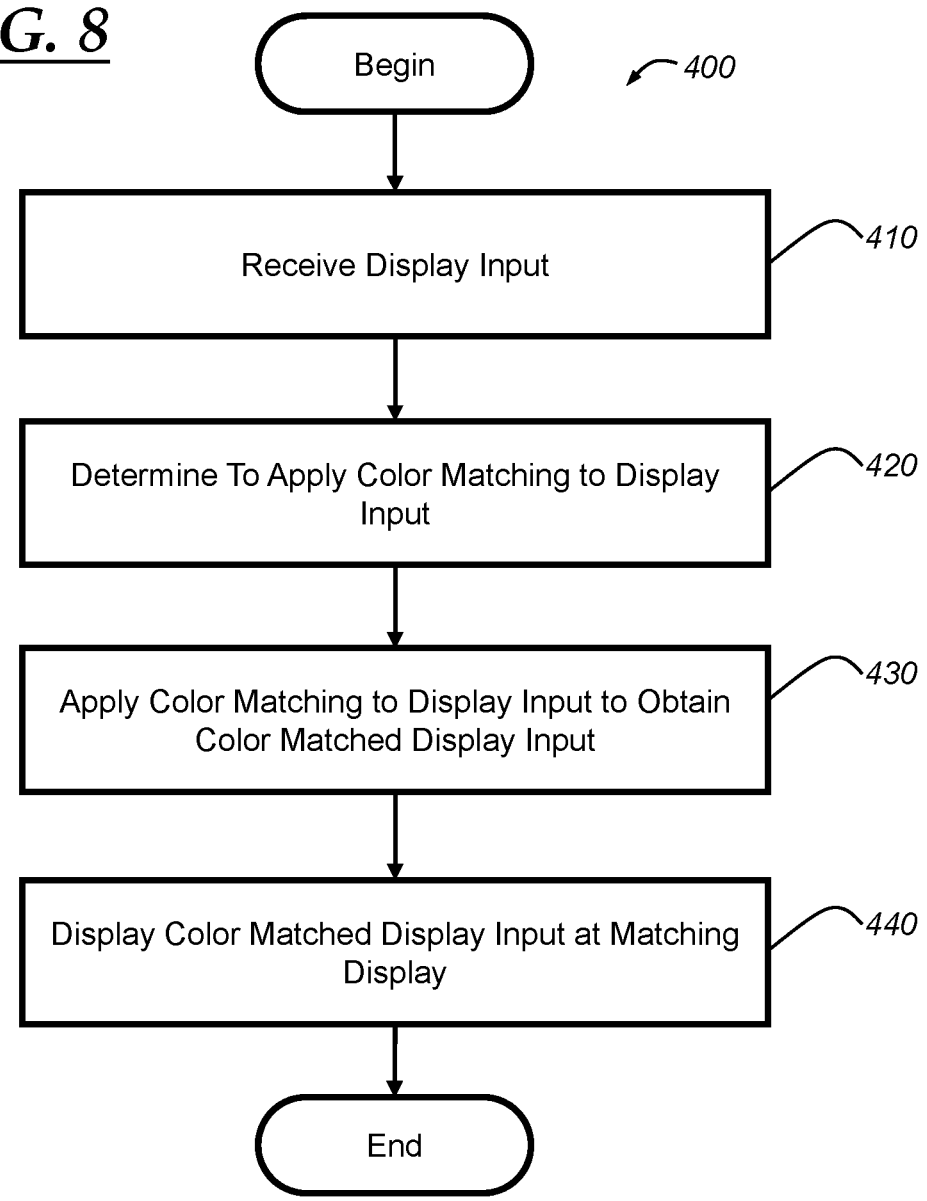
FIG. 8 shows a flowchart depicting a method of displaying a color matched display output on a matching display so that the colors of the matching display match those of a reference display.

The onboard vehicle computer 130 is an onboard computer in that it is carried by the vehicle 102 and is considered a vehicle computer since it is a part of the vehicle electronics 104. The onboard vehicle computer 130 includes at least one processor 132 and non-transitory, computer-readable memory 134 that is accessible by the at least one processor 132. The onboard vehicle computer 130 may be used for various processing that is carried out at the vehicle 102 and, in at least one embodiment, forms at least a part of the display system 110 and is used to carry out one or more steps of one or more of the methods described herein, such as the method 400 (FIG. 8). The onboard vehicle computer 130 is connected to the vehicle communications bus 116 and may send messages to, and receive messages from, other vehicle components using this bus 116. The onboard vehicle computer 130 may be communicatively coupled to the network access device 138 so that data may be communicated between the onboard vehicle computer 130 and a remote network, such as the backend server(s) 108.

In one embodiment, the onboard vehicle computer 130 stores, in memory 134, display configuration information, such as color mapping information for mapping colors for a reference display and a matching display. In some embodiments, the onboard vehicle computer 130 may store a plurality of color mapping information entries in memory 134, where each of the color mapping information entries is generated based on a device-to-independent color mapping for a reference display and a device-to-independent color mapping for a matching display, which may be determined using the method 200 (FIG. 3). In some embodiments, updated or new color mapping information entries (or color mapping information) may be generated and/or transmitted (using one or more over the air (OTA) messages) to the in-vehicle display system 110 from the backend server(s) 108. The in-vehicle display system 110, such as through use of the onboard vehicle computer 130, then may be updated to use the new or updated color mapping information that was received.

As shown in the illustrated embodiment, the display system 110 includes the first and second display devices 112, 144, and may further include the onboard vehicle computer 130. In one embodiment, at least one of the one or more processors carried by the vehicle 102 that forms a part of the display system 110 is a graphics processing unit (GPU). The memory (which may be non-transitory, computer-readable memory) 134 stores computer instructions that, when executed by the at least one processor 132, cause one functionality attributed to the display system 110 to be carried out.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

With reference to FIG. 3, there is shown an embodiment of a method 200 of configuring a display system to color match two or more electronic displays of the display system. According to at least some embodiments, the method 200 is used to configure two or more electronic displays to be consistent in their emitted color output such that a common input color value, which may be specified in an input color space (and which may be in a digital format), is emitted as the same color by the two or more displays that have been color matched. The first electronic display is considered to have a first color space, which corresponds to a set of colors that are emitted by the first electronic display when displaying a reference input image, and the second electronic display is considered to have a second color space, which corresponds to a set of colors that are emitted by the second electronic display when displaying the reference input image.

The method 200 is used to generate display configuration information, which is the information used to configure the display system to color match the two or more displays. According to at least some embodiments, the display configuration information is thus effective for use by the display system for a display process in which: a color input specifying a color is received; the color input is displayed by a reference electronic display; the color input is transformed into a transformed color input; and the transformed color input is displayed by a matching electronic display, wherein the matching electronic display is an electronic display of the display system that is not the reference display. The color input may be specified in a predetermined color space, such as an RGB-based color space, and, in such an embodiment, the color input may be specified as an RGB triplet, such as {213,239,67} for {R,G,B} with each channel being an integer between 0-255 (inclusive of bounds), for example. The color input may correspond to a pixel of an image or graphic that forms a display input that is to be displayed, at least in some embodiments.

In one embodiment, the first electronic display is a display monitor, such as an OLED monitor or LCD that may be used to present text, symbols, or other graphics. In one embodiment, the second electronic display is a non-resolute display, which is an electronic display that is not a display monitor and that generally is not defined by a resolution indicating an amount of pixels, whereas a display monitor generally is specified in such a manner. Examples of non-resolute displays include a single RGB-controllable LED, a LED light string or strip having a plurality of RGB-controllable LEDs, lights for illumination of a region (such as a passenger cabin or cockpit of a vehicle), and backlit optical devices used for providing illumination through a waveguide (e.g., implementing fiber optics used for accent lighting within a vehicle interior or cockpit, for example).

In other embodiments, the first electronic display and the second electronic display are both display monitors, such as LCD and/or OLED displays; and in yet another embodiment, the electronic display and the second electronic display are both non-resolute displays. According to one embodiment, a selection process for selecting a display from a plurality of displays of the display system to be a reference display includes selecting the reference display on the basis of which display has a lower color gamut or size of color set of colors that may be produced.

The method 200 may be carried out by a display configuration system, such as the display configuration system 11. Although the method 200 may be described with respect to carrying out steps 210-260 in a particular order, it should be appreciated that the steps 210-260 may be carried out in any technically-feasible order, such as where steps 240 and 250 are carried out in reverse order or at the same time.

The method 200 begins with step 210, wherein first spectral response readings for a first electronic display and second spectral response readings for a second electronic display are obtained from one or more spectral response devices. In at least one embodiment, the first spectral response readings for the first electronic display and the second spectral response readings for the second electronic display are obtained through use of a grayscale ramping technique. The one or more spectral response devices may be or include the spectral response device 52, which may be a spectrophotometer or colorimeter as discussed above. In the case of using a colorimeter, the colorimeter may be calibrated or profiled for measurement with the respective electronic display that the colorimeter is measuring. This calibration information may be determined using a spectrophotometer or selecting predefined calibration information, such as those compiled in Argyll Color Management System (ArgyllCMS). In at least some embodiments, the same spectral response device is used to measure spectral response readings from the first electronic display and the second electronic display. In other embodiments, however, the devices may be measured using different spectral response devices, which may be of the same or different model spectral response device.

Figure 4:
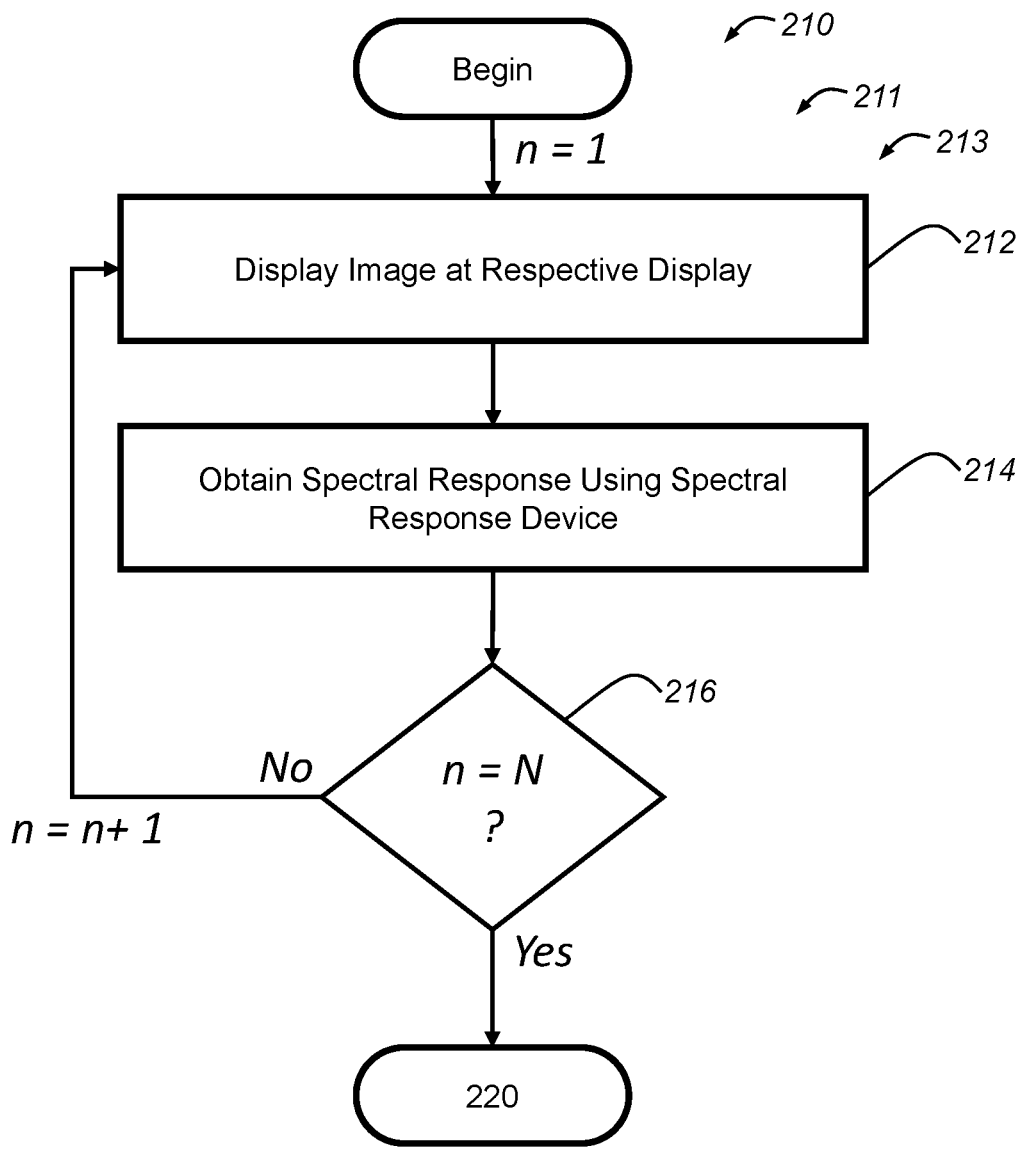
FIG. 4 shows a flowchart depicting, according to one embodiment, a grayscale ramping process and a step for obtaining first spectral response readings for a first electronic display and second spectral response readings for a second electronic display from one or more spectral response devices, which may be used as a part of the method of FIG. 3.

With reference to FIG. 4, there is shown an embodiment of the step 210 in which an exemplary grayscale ramping process 211 is used as the grayscale ramping technique, which is performed for both the first electronic display and the second electronic display. The grayscale ramping process 211 is carried out for an electronic display, which is sometimes referred to as the respective display. In the method 200, the grayscale ramping process 211 is carried out for the first electronic display and the second electronic display. In such embodiments, the second electronic display may act as the reference display for color mapping. And although the grayscale ramping process 211 is described with reference to the first electronic display and the second electronic display, it should be appreciated that the process 211 may be performed for any number of displays. According to one embodiment, the process 211 is carried out for the first electronic display and then is carried out for the second electronic display.

The grayscale ramping process 211 and step 210 begins with a first step of an iterative process 213, where the first step is step 212, wherein an image represented by a digital grayscale input $i_n$ is displayed at a respective display. The image, which may be referred to as a grayscale image, is displayed by the respective display (e.g., the first electronic display, the second electronic display), which may be situated in a controlled ambient setting and/or may be initialized to a predetermined configuration. Initializing the respective display to a predetermined configuration may include adjusting the respective display to one or more predetermined settings, such as brightness or color temperature, at least in some embodiments. The digital grayscale input in is represented by a digital color model, such as RGB triplets or CMYK quadruples, and may be sized according to the resolution of the respective display. The respective display has a color gamut defined on a color space, which may be a device-specific color space, such as Adobe RGB or sRGB. The first iteration of step 212 includes using an initial digital grayscale input $i_n$. In at least some embodiments, the digital grayscale inputs in of each iteration define an image of a single color and the single color is such that each channel of the color space of the respective display has the same value. For example, when using a RGB-based color space, the RGB triplet for the initial digital grayscale input $i_n$ may be {0, 0, 0} for {R,G,B} where each channel (e.g., red channel R) may have possible values 0-255. This exemplary initial digital grayscale input in corresponds to a black color here in this example. In other embodiment, the initial digital grayscale input in may be {255, 255, 255}, corresponding to a white color. The method 200 continues to step 214.

In step 214, which is considered a second step of the iterative process 213, a spectral response is obtained using a spectral response device, which may be at least one of the spectral response devices discussed above. The spectral response device is configured prior to initially capturing or obtaining any spectral response, which is discussed below and which may include positioning and/or orienting the spectral response device so as to face the respective display such that sensor(s) of the spectral response device may capture light emitted by the respective display and/or such that the spectral response device is positioned and/or oriented at a selected point of view. After the spectral response is captured or otherwise obtained by the spectral response device, the spectral response may be stored in memory, such as memory of the spectral response device or memory of a computer or other electronic device having such memory that is communicatively coupled to the spectral response device. In other embodiments, the spectral response may be kept in a volatile memory, such as dynamic random-access memory (DRAM), and then stored at a later time, such as after each iteration of the process 213 is carried out for the respective display. The method 200 continues to step 216.

In step 216, it is determined whether another iteration of the process 213 is to be carried out. As discussed above, a single execution of the process 211 includes carrying out a total of N iterations for a respective display. Multiple executions of the process 211 may be carried out for a single respective device, however, and thus the number of total iterations is on the scale of N*M where M is the number of executions—it should also be appreciated that the number of iterations N may vary for the executions. For example, in one embodiment, three (M=3) executions of the process 211 are carried out for a single respective display, each execution m using the respective display at a different set brightness—e.g., a first execution (m=1) uses the respective display at a brightness setting of 100%, a second execution (m=2) uses the respective display at a brightness setting of 80%, and a third execution (m=3) uses the respective display at a brightness setting of 40%. Each of these three executions may have a different number of iterations N, which can be represented as $N_m$ for an execution m. In the example above, $N_1$ may be 20, $N_2$ may be 20, and $N_3$ may be 15, which may account for the fact that spectral responses at a lower luminance (or brightness) may not provide as useful data for dark colors, such as low levels for each channel in an RGB-based color space. If the total number of iterations for the execution has not yet been carried out (e.g., number of iterations performed<N), the method 200 continues back to step 212 (and the current iteration is stepped forward as indicated by "n=n+1"); otherwise, the process 211 ends and the method continues to step 220.

When the method 200 continues back to step 212, the digital grayscale input in is changed and, in at least some embodiments, is increased or decreased evenly for each channel of a color space corresponding to the respective electronic display relative to the previous digital grayscale input Here, "evenly" refers to a change in each channel that is of the same magnitude and the color space corresponding to the respective electronic display refers to the color space of the electronic display that is used to display the image. For example, when the previous digital grayscale input $i_{n-1}$ is {0, 0, 0}, each channel is incremented by a predetermined amount, such as {+16, +16, +16} to yield {16, 16, 16}. In such an example, the total number of iterations may be set to N=16 so that the grayscale images span from a black color {0, 0, 0} to a white color {255, 255, 255}—it is noted that one of the iterations in such an example is only incremented by 15 instead of 16 so the last values do not exceed 255—in such embodiments where the values are incremented or decremented by a predetermined amount that is the same for each iteration (except at most one iteration, such as the example above with N=16), it is said that the digital grayscale input in is linearly changed or simply is linear. In other embodiments, the digital grayscale input in is decremented instead of incremented such as where an initial digital grayscale input in is a white color and the last digital grayscale input in is a black color. In other embodiments, the incrementing or decrementing may be non-linear, such as where it may follow a curve (or other predefined function) or predetermined set of values where some changes in values between iterations is larger than others.

Figure 5:
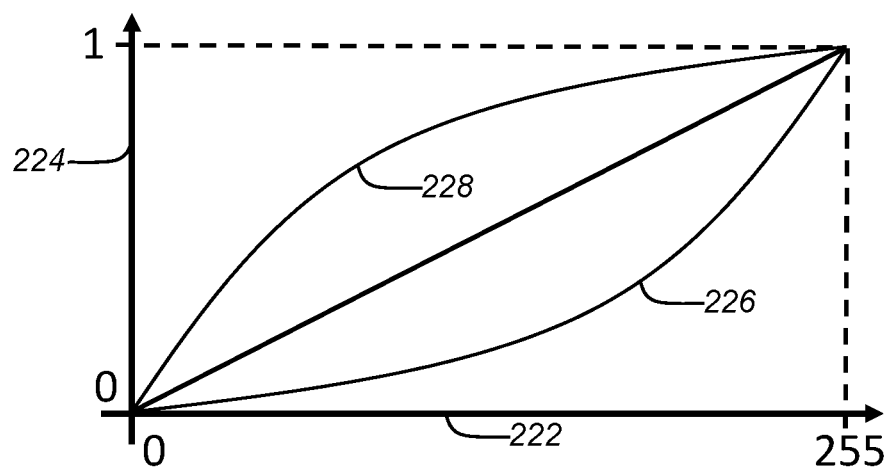
FIG. 5 shows an example of a graph illustrating a response curve that illustrates a relationship between a digital input and an outputted luminance of a respective display, which was obtained using the grayscale ramping process of FIG. 4 and which is used as a part of the method of FIG. 3.

With reference back to FIG. 3, step 220 includes determining a first spectral response curve based on the first spectral response readings and a second spectral response curve based on the second spectral response readings. In at least some embodiments, the first spectral response curve and the second spectral response curve are determined by obtaining a relationship between relative luminance γ [0,1] as indicated by the spectral response readings and the digital grayscale inputs $i_n$ (x in the response curve equations below) used by the respective display (e.g., the first spectral response readings for the first electronic display for purposes of determining the first spectral response curve, the second spectral response readings for the second electronic display for purposes of determining the second spectral response curve) for generating the images for which the spectral response readings are obtained. An exemplary response curve is shown in FIG. 5. The response curve may have a gamma shape, such as is indicated in FIG. 5, which is shown as providing a relationship between a digital input specified from 0 to 255 as indicated at 222 and a relative luminance γ [0,1] as indicated at 224. The response curve may be stated as $FunRC_j(x)$ for display j and, in embodiments where the response curve has a gamma shape (indicated at 226), the response curve may be defined as $FunRC_j(x)=x^\gamma$ generally and an inverse response curve function $Inv\_FunRC_j(x)$ may be defined as $Inv\_FunRC_j(x)=x^{1/\gamma}$ (indicated at 228). It should be appreciated that the inverse response curve is considered a response curve that indicates an inverse relationship of the measured response curve. It should be appreciated that, at least in some embodiments, the first spectral response curve and the second spectral response curve do not have to be determined concurrently and that the portions of step 210 and step 220 for the first electronic display may be performed prior to carrying out the portions of step 210 and step 220 for the second electronic display. The method 200 continues to step 230.

Figure 6:
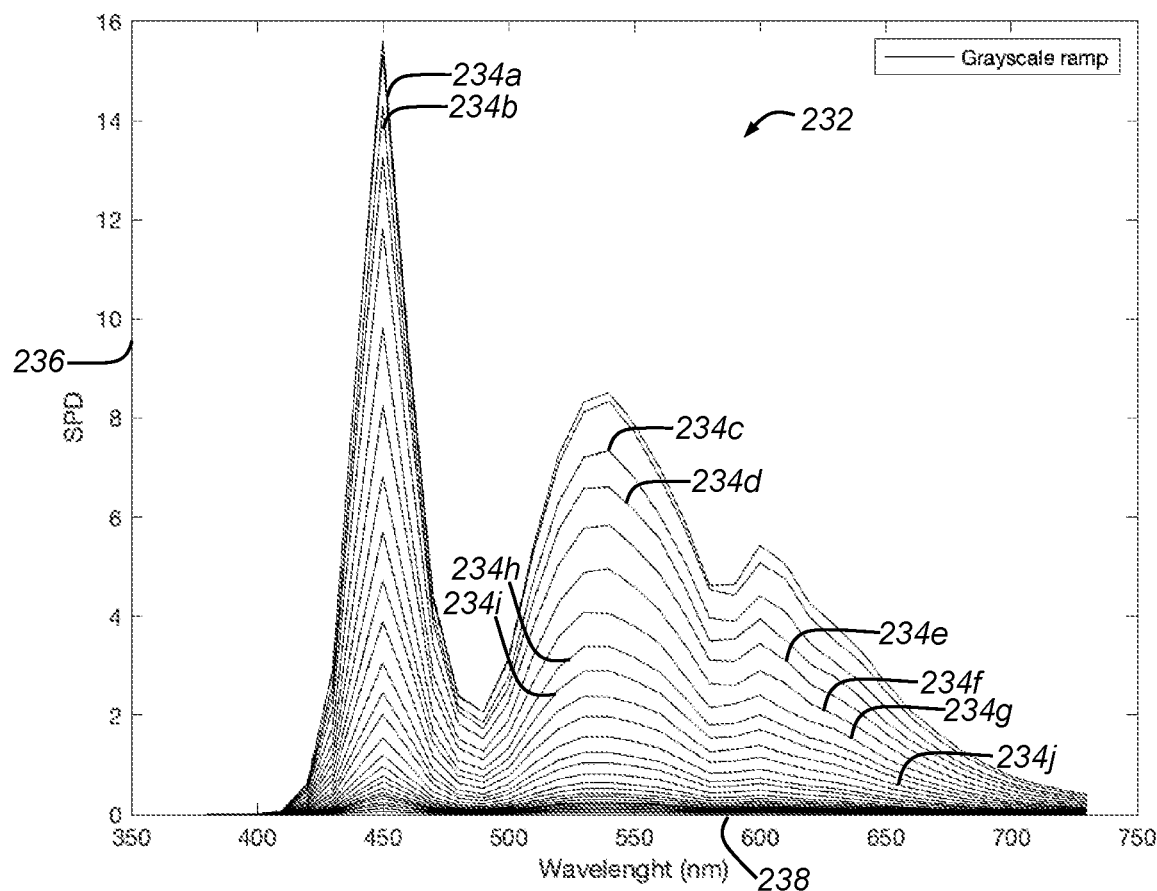
FIG. 6 shows an example of a spectral power distribution is that obtained using the grayscale ramping process of FIG. 4 and used as a part of the method of FIG. 3.

In step 230, a first spectral power distribution based on the first spectral response readings and a second spectral power distribution based on the second spectral response readings are determined. In at least some embodiments, the first spectral power distribution and the second spectral power distribution are determined by obtaining a relationship between emitted power and wavelength based on the spectral response readings. For example, for the first electronic display, the first spectral power distribution may be obtained using the first spectral response readings, which may include the N spectral response readings. FIG. 6 illustrates an exemplary spectral power distribution 232 that is obtained based on the N spectral response readings 234a-j (only ten labelled). The spectral power distribution 232 is shown as a graph in which spectral power distribution (indicated at 236) is shown for wavelengths in the visible range as indicated at 238. In one embodiment, the spectral response reading 234a was obtained first and the digital grayscale input in for this first reading 234a (where n=1) was an input of {255,255,255} for a RGB space representing a white color. The next iteration (where n=2) produced reading 234b, which was linearly stepped down from the {255} input, such as to {245} for example for a {245,245,245} color for an RGB based space.

Any one or more of the spectral power distributions (e.g., the first spectral power distribution and the second spectral power distribution) may be represented or converted to independent color space values, such as those of CIE XYZ or CIE Lab. A spectral power distribution may also be used to calculate or otherwise determine a dependent-to-independent color space mapping, which may be represented as a matrix and referred to as a dependent-to-independent color space mapping matrix.

According to at least some embodiments, a first dependent-to-independent color space mapping matrix $mat_{RGB2XYZ_1}$ (j=1 for the first electronic display) is determined for the first electronic display and a second dependent-to-independent color space mapping matrix $mat_{RGB2XYZ_2}$ (j=2 for the second electronic display) is determined for the second electronic display. In one embodiment, the dependent-to-independent color space mapping matrices may be defined $mat_{RGB2XYZ_j}$ as follows:

$$mat_{RGB2XYZ_j} = \begin{bmatrix} R_x \frac{C_{rD}}{D} & G_x \frac{C_{gD}}{D} & B_x \frac{C_{bD}}{D} \\ R_y \frac{C_{rD}}{D} & G_y \frac{C_{gD}}{D} & B_y \frac{C_{bD}}{D} \\ (1-R_x-R_y)\frac{C_{rD}}{D} & (1-G_x-G_y)\frac{C_{gD}}{D} & (1-B_x-B_y)\frac{C_{rD}}{D} \end{bmatrix}$$

and where:

$$C_{rD} = \left(\frac{1}{W_y}\right)(W_x(G_y - B_y) - W_y(G_x - B_x) + G_x B_y - G_y B_x),$$

$$C_{gD} = \left(\frac{1}{W_y}\right)(W_x(B_y - R_y) - W_y(B_x - R_x) + R_x B_y - R_y B_x),$$

$$C_{bD} = \left(\frac{1}{W_y}\right)(W_x(R_y - G_y) - W_y(R_x - G_x) + R_x G_y - R_y G_x),$$

$$D = R_x(G_y - B_y) + G_x(B_y - R_y) + B_x(R_y - G_y)$$

and where each primary color of the display (e.g., red R, green G, blue B) and white W are calculated by $Color_x=Color_X/(Color_X+Color_Y+Color_Z)$ and $Color_y=Color_Y/(Color_X+Color_Y+Color_Z)$ with Color={R, G, B, W} so as to yield $R_x$, $R_y$, $G_x$, $G_y$, $B_x$, $B_y$, $W_x$, and $W_y$. The values for $Color_X$, $Color_Y$, and $Color_Z$ for each of Color={R, G, B, W} is determined in step 210, such as through use of the spectral response device 52 and, in particular, through the spectral power distribution, which may be represented by a collection of values for an independent color space, such as CIE XYZ triplets for each color and white, such as when using an RGB-based color space. This yields the values: $R_X$, $R_Y$, and $R_Z$ for red R; $G_X$, $G_Y$, and $G_Z$ for green G; $B_X$, $B_Y$, and $B_Z$ for blue B; and $W_X$, $W_Y$, and $W_Z$ for white W. It should be appreciated that, depending on the particular application and implementation in which the dependent-to-independent color space mapping matrix is used, an inverse dependent-to-independent color space mapping matrix $mat_{RGB2XYZ_j}^{-1}$ may be used, and such an inverse dependent-to-independent color space mapping matrix is the same as the dependent-to-independent color space mapping matrix but is inversed and is thus also considered to be a dependent-to-independent color space mapping matrix. In some embodiments, the dependent-to-independent color space mapping matrix and/or the inverse of the dependent-to-independent color space mapping matrix may be stored in memory for the first electronic display and/or the second electronic display. The method 200 continues to step 240.

In step 240, a first device-to-independent color mapping is determined one or more display characteristics of the first electronic display, such as based on the first spectral power distribution and the first spectral response curve. The first device-to-independent color mapping represents a mapping between the first color space and an independent color space. In one embodiment, the first device-to-independent color mapping and the second device-to-independent color mapping are each defined using the following:

$$\text{Function}_j(r, g, b, \text{mat}_{RGB2XYZ_j}, \text{FunRC}_j) = X_j, Y_j, Z_j$$

where $(r, g, b) \in [0,1]$ and $$[X_j, Y_j, Z_j] = [\text{FunRC}_j(r), \text{FunRC}_j(g), \text{FunRC}_j(b)]^T \cdot \text{mat}_{RGB2XYZ_j}$$

where j=1 for the first electronic display and j=2 for the second electronic display. As shown in the equation above, the response function or operation $\text{FunRC}_j$ is applied to each value of each channel of the input image pixel, which is represented by r for red, g for green, and b for blue. In the above device-to-independent color mapping, the device-dependent color space is an RGB-based color space, which may be an Adobe RGB or sRGB, and which is considered a measured device-to-independent color mapping in that the mapping is based on measured data (or, specifically, spectral response readings) of the display using the device-dependent color space of the display. An inverse representation of this device-to-independent color mapping may also be used as the device-to-independent color mapping in which color values in an independent color space may be mapped to color values in a dependent color space. The inverse device-to-independent color mapping may be defined as:

$$\text{Inv\_Function}_j(X, Y, Z, \text{mat}_{RGB2XYZ_j}^{-1}, \text{Inv\_FunRC}_j) = r_j, g_j, b_j$$

where $(r, g, b) \in [0,1]$ and $$[r'_j, g'_j, b'_j] = [X, Y, Z]^T \cdot \text{mat}_{RGB2XYZ_j}^{-1} \text{ and}$$

$$[r_j, g_j, b_j] = [\text{Inv\_FunRC}_j(r'_j), \text{Inv\_FunRC}_j(g'_j), \text{Inv\_FunRC}_j(b'_j)]$$

where the input color value (a CIE XYZ triplet in this mapping) is represented by X, Y, Z, and $r_j$, $g_j$, $b_j$ is the output color value in the device-dependent color space, which is an RGB-based color space in this embodiment. The method continues to step 250.

In step 250, a second device-to-independent color mapping is determined based on the one or more display characteristics of the second electronic display, such as based on the second spectral power distribution and the second spectral response curve. The second device-to-independent color mapping represents a mapping between the second color space and the independent color space. The discussion above in step 240 with respect to the first device-to-independent color mapping applies equally to this step with respect to determining the second device-to-independent color mapping. It should be appreciated that the steps 240 and/or step may be performed concurrently, with step 250 before step 240, or with step 240 before step 250. The method continues to step 260.

In step 260, a display system having the first electronic display and the second electronic display is configured to match colors being displayed based on using the first device-to-independent color mapping and the second device-to-independent color mapping. In at least some embodiments, this includes configuring the display system with display configuration information that is derived based on the first device-to-independent color mapping and the second device-to-independent color mapping. In one embodiment, the display system may be configured to use this color mapping information (or display configuration information) with a color matching function to generate color matched display inputs that are then used by the matching display for display so that the colors of the matching display match those of a reference display. In the color matching function below, the first electronic display (j=1) is the reference display and the second electronic display (j=2) is the matching display.

$$[r_2, g_2, b_2] = \text{Inv\_Function}_2(\text{Function}_1(r, g, b, \text{mat}_{RGB2XYZ_1}, \text{FunRC}_1) \text{ mat}_{RGB2XYZ_2}^{-1}, \text{Inv\_FunRC}_2)$$

where the input color value in the device-dependent color space of the first electronic display is represented as an RGB triplet r, g, b and the output color value, which is in the device-dependent color space of the first electronic display, is represented as an RGB triplet is $r_2$, $g_2$, $b_2$. As mentioned above, this function may be referred to as a color matching function. In at least some embodiments, this step includes configuring the display system by storing, in memory of the display system, display confirmation information that includes one or more data structures that represent the first device-to-independent color mapping and the second device-to-independent color mapping. In one embodiment, for example, the one or more data structures could include values representing the $\text{mat}_{RGB2XYZ_1}$ for the first device-to-independent color mapping and the $\text{mat}_{RGB2XYZ_2}^{-1}$ for the second device-to-independent color mapping. In some embodiments, the response curves may be stored as a part of one or more data structures. It should be appreciated that various digital representations may be used for storing device-to-independent color mappings in memory.

In one embodiment, the step 260 includes generating the display configuration information, which is any information that is used to match colors between displays of the display system and, in the context of the discussion of the method 200, between the first electronic display and the second electronic display. In one embodiment, the display configuration information is used to match color(s) outputted by one or more matching displays to those color(s) outputted by a reference display. As mentioned above, the reference display is used as setting the basis for perception of the perceived color output and so the display configuration information, which may be generated based on the determined color mappings, is used by the display system to match outputted color of the matching displays, which are other electronic display(s) of the display system. The display system may thus be configured so that, when a given color input is received, the given color input is modified by processing the given color input with or according to the display configuration information so as to obtain a color-matching color output, which is then sent to the matching displays and used by the matching displays for outputting light. The input that the matching displays would otherwise use, which would be the color input without any processing for color matching and would correspond to input passed to the display for presentation or display, is modified according to the display configuration information. The original input, which is represented as the input without any processing for color matching as that which would correspond to input passed to the display for presentation/display, is passed to the reference display for display without any processing including without the processing done for color matching. The method 200 then ends.

Figure 7:
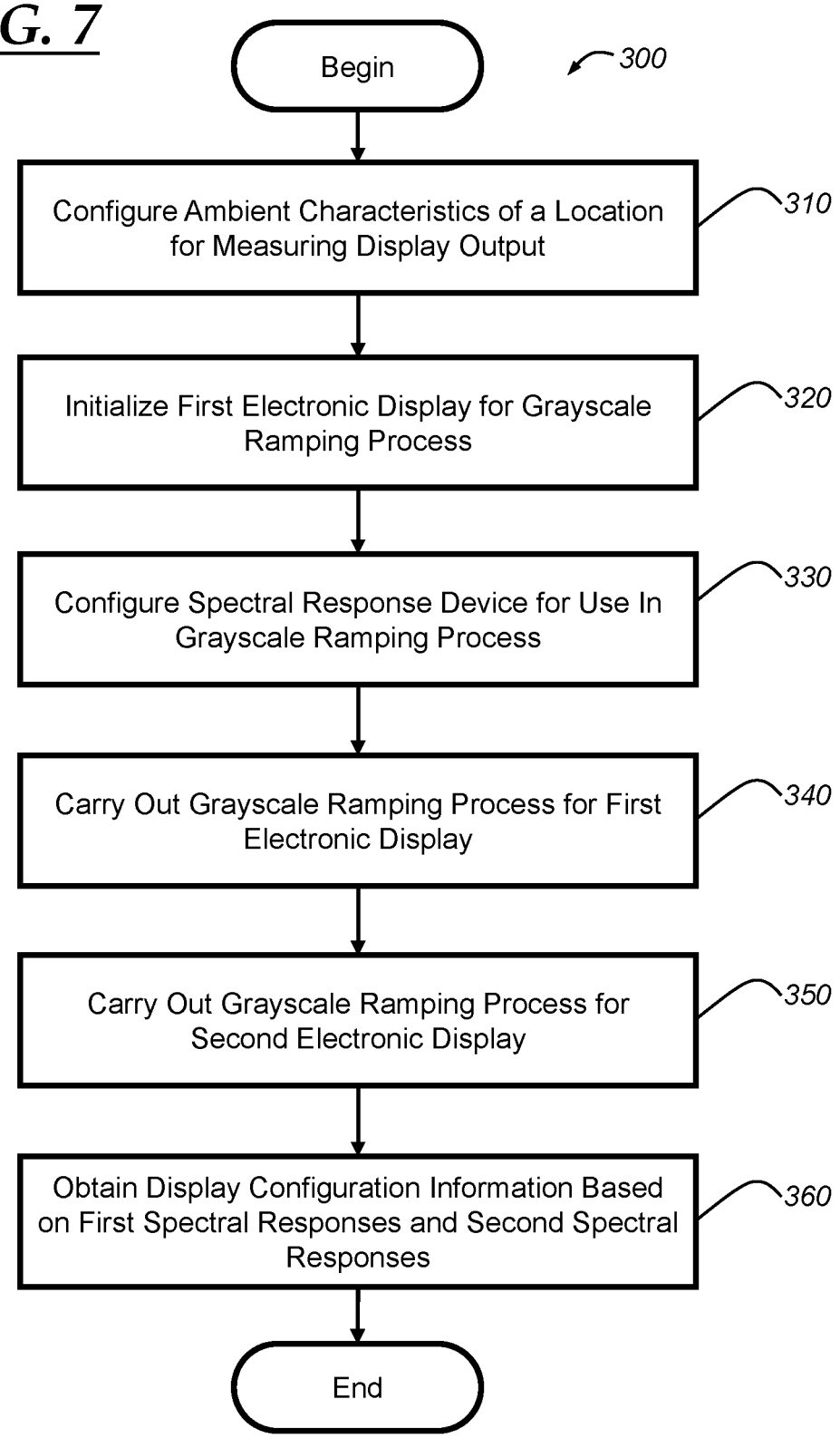
FIG. 7 shows a flowchart depicting a method for obtaining display characteristics for two or more electronic display that are to be color matched for use in a display system.

With reference to FIG. 7, there is shown a method 300 of obtaining display characteristics for two or more electronic display that are to be color matched for use in a display system. The method 300 begins with step 310 wherein ambient characteristics of a location for measuring a display output using a spectral response device are configured. This location may be referred to as a display measurement location and its ambient characteristics may be characterized by, for example, luminosity and color temperature. The location may be in, for example, a closed room with various light sources, such as light emitting diodes (LEDs) or incandescent bulbs, that may be used to control the ambient characteristics. In some embodiments, a dark room that has minimal ambient light may be used. As another example, the display measurement location may be chosen to be outdoors during times when certain ambient conditions are present (e.g., during daylight) and the precise ambient conditions may be recorded. The method 300 continues to step 320.

In step 320, the electronic displays are initialized for a grayscale ramping process in which a grayscale ramping technique is performed, such as that which is described above in process 211 (FIG. 4). In one embodiment, this step includes configuring a display brightness or color set/gamut for at least one of the electronic displays. This could also include adjusting other settings, such as color temperature. In one embodiment, the electronic displays are configured according to configurations to be used when integrated into a display system, such as an in-vehicle display system. In one embodiment, the electronic displays may operate in different color modes during execution of different applications or as requested or implemented by certain applications. In such embodiments, a single electronic display may thus be said to operate in a plurality of color modes, such as a first color mode with a color temperature of 6500K and a display brightness of 100% and a second color mode with a color temperature of 5000K and a display brightness of 60%. The electronic display may thus be initialized to one of these color modes for this method 300, which may include adjusting one or more display or color settings of the display, such as brightness or color temperature. For example, in one embodiment, the second color mode may be a mode that is used in conjunction with operation of the second electronic display during operation of the display system. Thus, the second color mode may be selected from the plurality of modes and the ambient conditions of the selected (here, the second) color mode may be used to initialize the electronic display. The method 300 continues to step 330.

In step 330, a spectral response device is configured for use in the grayscale ramping process. In one embodiment, such as where the spectral response device is a colorimeter, the colorimeter may be calibrated using a predefined calibration information, such as that which is compiled in Argyll Color Management System (ArgyllCMS). This information may be selected according to the electronic display whose output is to be measured. The spectral response device may be positioned according to a preselected position (e.g., represented by distance, heading, and elevation) and orientation from the electronic display, and this may be preset based on a predetermined point of view. For example, the predetermined point of view may be that of a driver or passenger in a cockpit of a vehicle having the electronic display. The method 300 continues to step 340.

In step 340, a grayscale ramping process is carried out for the first electronic display. The grayscale ramping process 211 (FIG. 4) may be carried out with the first electronic display being the respective display to obtain first spectral responses, which may then be used (along with spectral responses for one or more other displays in the display system, such as the second electronic display (see step 350)) for configuring a display system, such as that which is described in the method 200 (FIG. 3). The method 300 continues to step 350.

In step 350, a grayscale ramping process is carried out for the second electronic display. The grayscale ramping process 211 (FIG. 4) may be carried out with the second electronic display being the respective display to obtain second spectral responses, which may then be used for configuring a display system, such as that which is described in the method 200 (FIG. 3). It should be appreciated that the steps 340 and/or step may be performed concurrently, with step 350 before step 340, or with step 340 before step 350. The method 300 continues to step 360.

In step 360, the first spectral responses and the second spectral responses are used to obtain display configuration information that is used to match colors between the first electronic display and the second electronic display. This display configuration information may be that mapping information, including the first and second device-to-independent color mappings, discussed in step 260 of the method 200. This information may be stored on memory of the display system. The method 300 then ends.

With reference to FIG. 8, there is shown an embodiment of a method 400 of displaying a color matched display output on a matching display so that the colors of the matching display match those of a reference display. In at least one embodiment, the method 400 is performed by the display system 10 (FIG. 1). And, in one embodiment, the method 400 is performed by the in-vehicle display system 110 (FIG. 2) through use of the onboard vehicle computer 130. The method 400 begins with step 410, wherein a display input is received. The display input is any input representing color information that is to be displayed. The display input may be in digital form, and may comprise any of a number of images and/or graphics, including images of a vehicle environment as captured by the one or more cameras 136 and/or predetermined graphs. The display input may be represented by a plurality of pixels that each are represented by an RGB triplet, such as {0,0,0} for black. Of course, other representations and form of the display input may be used. The display input corresponds to an image or graphic that is to be presented by a matching display of the display system. It should be appreciated that the method 400 may be carried out for each of the matching displays of the display system. The method 400 continues to step 420.

In step 420, it is determined to apply color matching to the display input. In one embodiment, it is determined to apply color matching to the display input based on a configuration of the display system. In some embodiments, the display system may be configured to always match a particular display (a matching display) with another display and so it may be said that when the display system operates to pass the display input into a software module (a logical function) that applies color matching to the display input for purposes of producing color matched display input, then it has been determined to apply color matching to this matching display. In another embodiment, this step 420 includes determining a color matching portion of an image to be displayed as the display input, wherein the color matching portion of the image constitutes a part of the image that is less than the entire image. It should be appreciated that the color matched portion include at least one contiguous portion of the image, but the color matching portion may include a plurality of contiguous portions of the image in some embodiments. The color matching portion of the image may be selected programmatically based on computer instructions that implement logic and/or machine learning techniques to identify the parts of the image to be color matched (the color matched portion).

In some embodiments, the step 420 further includes selecting a color mapping to apply to the color matching portion. The color mapping represents information (which may be embodied in a function or functions) that is used to color match a reference display with at least one matching display. The color mapping information may be determined using the method 200 and may correspond to the device-to-independent color mappings of steps 240 and 250 of the method 200. It should be appreciated that the color mapping information may take many forms, such as various data structures or computer instructions implementing a color matching function using the color mappings (e.g., the device-to-independent color mapping of steps 240 and 250 of the method 200), and that this color mapping information is derived from the color mappings. In one embodiment, the display system may obtain information, such as predetermined information that is preconfigured or provisioned using over the air messages, that indicates a color mapping association (or color mapping information entries), which associates color mapping information with a set of color matching portions. The set of color matching portions may be predetermined—for example, when the display input (or at least the color matching portions of the display input) are comprised of predetermined graphics, then these color matching portions (which may be referred to as predetermined color matching portions) are associated with predetermined color mapping information, such as color mapping information based on device-to-independent color mappings for the matching device and the reference device. The color mapping may be selected on whether there is a color mapping association present for that color matching portion.

In some embodiments, the color mapping association information specifies color mapping association conditions that, when satisfied, indicate that the associated color matching portions be color matched with the specified color mapping information. Thus, in such embodiments, the color mapping association information specifies the color matching association conditions and the color mapping information that is to be applied if the conditions are met. For example, the color matching association conditions may specify that if the color input is a red color, which can be based on predefined ranges for channels of a color space (e.g., ranges for red R, green G, and blue B in an RGB-based color space), then the color mapping applies and the color mapping may be for matching the red colors of the display input to be displayed on an OLED monitor (an example of a display monitor used as the matching display) with the red color outputted by a RGB-controllable LED light (an example of a non-resolute display used as the reference display). The method 400 continues to step 430.

In step 430, the color matching is applied to the display input to obtain color matched display input. In at least one embodiment, the color matching is applied using color mapping information that is based on a device-to-independent color mapping of the matching display and a device-to-independent color mapping of the reference display. In some embodiments, the color mapping information is used with the display input that is to be color matched as input into a color mapping function, which may correspond to the following (as discussed above in step 260 of the method 200):

$$[r_2, g_2, b_2] = \text{Inv\_Function}_2(\text{Function}_1(r, g, b, \text{mat}_{RGB2XYZ_1}, \text{FunRC}_1), \text{mat}_{RGB2XYZ_2}^{-1}, \text{Inv\_FunRC}_2)$$

This method may be applied for each pixel of the display input to be color matched (or the color matching portion of the display input) to produce a color matched output $[r_2, g_2, b_2]$. The color input, which may correspond to an individual pixel, is represented above by r, g, b and the color mapping information is represented by $\text{mat}_{RGB2XYZ_1}$ for the reference display and $\text{mat}_{RGB2XYZ_2}$ for the matching display. Also, as shown in the equation above, the inputs may be adjusted using response curve information as represented by $\text{FunRC}_1$ for the reference display and $\text{FunRC}_2$ for the matching display. This function (or color mapping function) may be reduced to logic and represented by computer instructions that take the color mapping information ($\text{mat}_{RGB2XYZ_1}$ for the reference display and $\text{mat}_{RGB2XYZ_2}$ for the matching display) and color input as input and produce the color matched output $[r_2, g_2, b_2]$. The color mapping information may also be stored in memory of the display system along with the color mapping function. The color matching may be applied for each pixel (color input) of the color matching portion of the display input so as to produce a color matched output. Each of the color matched outputs (each of which may correspond to an individual pixel) may be used in place of the color input in the display input so that the display input is transformed so as to produce a color matched display input. The method 400 continues to step 440.

In step 440, the color matched display input is displayed at the matching display. In one embodiment, an electronic device that is separate from the matching display and/or the reference display carries out the steps 410-430 so as to produce the color matched display input. This electronic device, which may be the onboard vehicle computer 130 in the case of the method 400 being carried out using the display system 110, may then send the color matched display input to the matching display so as to cause the color matched display input to be displayed by the matching display. Thus, at least according to some embodiments, the color matched display input is generated using the display configuration information, which may be included in the display system as a result of the method 200 (FIG. 3), and then the color matched display input is then used in lieu of (or in place of) a display input that would (without the color matching) simply be passed to the matching display for display. Therefore, according to at least some embodiments, the method(s) described herein may be used to provide a simple and quick color matching process that is robust to change of luminance and display brightness. Moreover, according to some embodiments, the method(s) described herein may be used to provide a color matching technique that adapts better to matching electronic displays of different technologies, such as for color matching an OLED display to an LCD display or color matching an LCD display to a simple LED light string (i.e., a string of LED lights). The method 400 then ends.

Figure 9:
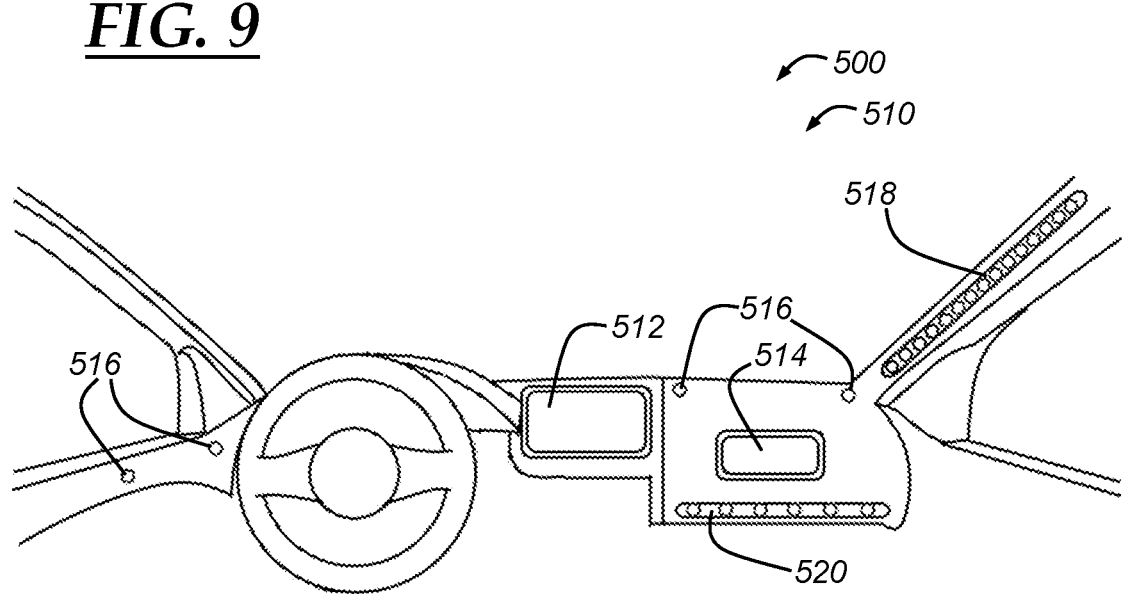
FIG. 9 depicts a perspective view of an exemplary vehicle cockpit having an in-vehicle display system that is configured according to the method(s) described herein.

With reference to FIG. 9, there is shown an exemplary vehicle cockpit 500 having an in-vehicle display system 510. The in-vehicle display system 510 includes a plurality of displays, namely a first electronic display 512 that is illustrated as a monitor, a second electronic display 514 that is also illustrated as a monitor, a third electronic display 516 that is illustrated as a plurality of LEDs that are sparsely disposed throughout the cockpit 500, a fourth electronic display 518 that is illustrated as a light strip disposed on an A-pillar portion of the cockpit 500, and a fifth electronic display 520 that is illustrated as a light strip that is disposed facing a passenger set. It should be appreciated that this exemplary vehicle cockpit 500 and the in-vehicle display system 510 are exemplary and that various other configurations and devices may be used as a part of the cockpit 500 and/or the display system 510. The in-vehicle display system 510 may include any one or more components of the display system 10 (FIG. 1) and/or the in-vehicle display system 110 (FIG. 2) described above. In at least one embodiment, the in-vehicle display system 510 includes a computer, such as the onboard vehicle computer 130 of the display system 110 (FIG. 2), that is configured with display configuration information, such as color mapping information for color matching two or more of the displays 512-520. The first electronic display 512 and the second electronic display 514 are display monitors in the illustrated embodiment. In some embodiments, the third electronic display 516, the fourth electronic display 518, and/or the fifth electronic display 520 each include multi-color LEDs, for example, and are each considered a non-resolute display. In one embodiment, for example, the multi-color LEDs may use three or more light emitting sources, such a red LED, a blue LED, and a green LED, and may vary primary color outputs so as to produce a wide variety of colors.

In one embodiment, the first electronic display 512 is a primary in-vehicle display monitor, such as a primary infotainment display monitor (e.g., LCD, OLED monitor). This primary in-vehicle display may be situated or disposed between a driver and front passenger seat within a dashboard of the vehicle and may be used as a primary control interface for a vehicle user (e.g., driver, passenger). In some embodiments, the primary in-vehicle display may be a touchscreen that allows input from a vehicle user.

Figure 10:
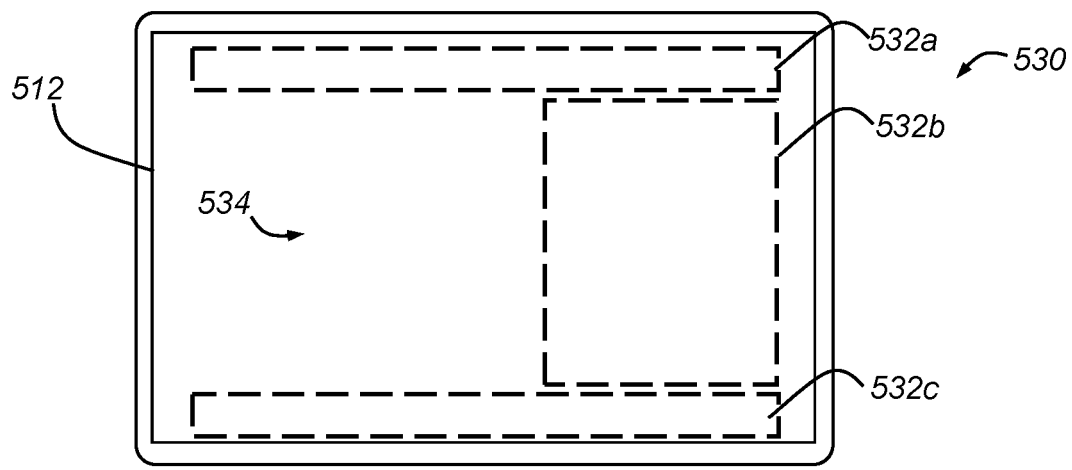
FIG. 10 is a diagrammatic depiction of a first electronic display of the in-vehicle display system of FIG. 9, and which is shown displaying a display input along with a color matching portion comprised of a plurality of color matching sub-portions.

With reference to FIG. 10, and still with reference also to FIG. 9, there is shown a diagrammatic depiction of the first electronic display 512 of the in-vehicle display system 510, which is described below as being used to display a display input. The display input of the display 512 is shown as including a color matching portion 530 that is comprised of three sub-portions including a first color matching sub-portion 532a, a second color matching sub-portion 532b, and a third color matching sub-portion 532c. The display input is also shown as including a non-color matching portion 534, which is a portion of the display input that corresponds to an area that outside the color matching portion 530 (i.e., the portion of the display input that is not the color matching portion). As an example, the in-vehicle display system 510 may be configured to use the first electronic display 512 as the matching display that is configured to match a plurality of displays (and a plurality of display simultaneously as illustrated in FIG. 10).

In particular, in this example, the in-vehicle display system 510 is configured to match the first color matching sub-portion 532a to the third electronic display 516 (the reference display), to match the second color matching sub-portion 532b to the second electronic display 514 (the reference display), and to match the third color matching sub-portion 532c to the fifth electronic display 520 (the reference display). In such an example, the in-vehicle display system 510 may have stored in memory color mapping information (color mapping information entries) that is based on device-to-independent color mappings for the matching device (the first electronic display 512) and the reference display (the third electronic display 516, the second electronic display 514, and the fifth electronic display 520). The in-vehicle display system 510 may also have stored computer instructions that implement the above-described color matching function, which may take the color input (e.g., a pixel of the color matching portion of the display input) along with the color mapping information, which is selected according to the displays to be matched. For example, for pixels within the first color matching sub-portion 532a, color mapping information that is generated based on using the first electronic display 512 as the matching display and using the third electronic display 516 as the reference display is used and inputted into the color mapping function to obtain a color matched output for each pixel. These color matched pixels of the first color matching sub-portion 532a form part of a color matched display input along with color matched pixels of the second color matching sub-portion 532b and third color matching sub-portion 532c that are color matched using the color matching function but with the second electronic display 514 and the fifth electronic display 520 as the reference displays.

According to another embodiment, one or more of the other electronic displays 514-520 may be used as a matching display, at least according to some embodiments, and the primary in-vehicle display 512 may be used as the reference display such that the outputted colors of each of the other electronic display(s) 514-520 (configured as a matching display) may be adjusted to match the outputted color of the primary in-vehicle display 512, or a portion thereof, such as is discussed above. In embodiments, a single electronic display, such as the primary in-vehicle display 512, is used as a reference display and includes one or more color reference sub-portions, which (in the presently-described embodiment) may correspond to portions 532a-c, and each of these may be used as a reference for matching colors of a different matching display. In such embodiments, the method(s) 200, 300, and/or 400 may be carried out in which the spectral response device is directed to a particular color reference sub-portion of the display 512 and a different device-to-independent color mapping may be determined for each color reference sub-portion. Such embodiments may be useful for display monitors (e.g., LCDs, OLED monitors) that may have luminance and/or color output characteristics that vary over the area of the display monitor. For example, global dimming LCDs may not output a consistent luminance at all portions of the display screen.

According to embodiments, the methods 200, 300, and 400 as well as the display system and the display configuration system described above may be used in non-vehicular applications, such as for color matching of display inputs on a handheld mobile device, such as a smartphone, or on a personal computer, such as a laptop or desktop computer.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for color matching two or more electronic displays of a display system, comprising:
    obtaining first spectral response readings for a first electronic display and second spectral response readings for a second electronic display from one or more spectral response devices;
    determining a first spectral response curve based on the first spectral response readings and a second spectral response curve based on the second spectral response readings;
    determining a first spectral power distribution based on the first spectral response readings and a second spectral power distribution based on the second spectral response readings;
    determining a first device-to-independent color mapping that represents a mapping between the first color space and an independent color space, wherein the first device-to-independent color mapping is determined based on the first spectral response curve and the first spectral power distribution;
    determining a second device-to-independent color mapping that represents a mapping between the second color space and the independent color space, wherein the second device-to-independent color mapping is determined based on the second spectral response curve and the second spectral power distribution; and
    configuring a display system having the first electronic display and the second electronic display to match colors being displayed based on using the first device-to-independent color mapping and the second device-to-independent color mapping,
    wherein the display system is configured to color match the second electronic display with a first color matching sub-portion of a display input for the first electronic display and to color match a third electronic display with a second color matching sub-portion of the display input for the first electronic display.

2. The method of claim 1, wherein the first spectral response readings for the first electronic display and the second spectral response readings for the second electronic display are obtained from the one or more spectral response devices through use of a grayscale ramping technique that includes an iterative process having N iterations, where, for each iteration n of the total N iterations, the iterative process includes:
    displaying an image represented by a digital grayscale input $i_n$ at a respective display, and
    obtaining a spectral response reading using at least one of the spectral response devices,
    wherein, for a next iteration n+1, the digital grayscale input $i_{n+1}$ is obtained by increasing or decreasing input values evenly for each channel of a color set corresponding to the respective electronic display relative to those input values used for the digital grayscale input $i_n$ for the current iteration n, wherein the first spectral response readings are obtained using the iterative process where the respective display is the first electronic display and the second spectral response readings are obtained using the iterative process where the respective display is the second electronic display.

3. The method of claim 2, wherein the first spectral response curve and the second spectral response curve are determined by obtaining a relationship between relative luminance as indicated by the spectral response readings and the digital grayscale inputs used by the respective display for generating the images for which the spectral response readings are obtained.

4. The method of claim 1, wherein the first spectral power distribution and the second spectral power distribution are determined by obtaining a relationship between emitted power and wavelength based on the spectral response readings.

5. The method of claim 4, wherein the first spectral power distribution is obtained using a grayscale ramping technique in which the first spectral response readings are obtained by the one or more spectral response devices.

6. The method of claim 1, wherein the configuring step includes storing color mapping information in memory of the display system, wherein the color mapping information is generated based on the determined first device-to-independent color mapping and the determined second device-to-independent color mapping.

7. The method of claim 6, wherein the color mapping information is configured for color matching the display input to be display on the first electronic display as a reference display so that a color matching display input is generated for display on the second electronic display as a matching display.

8. The method of claim 7, wherein the display system is configured with a color matching function that is configured to produce the color matching display input based on using the color mapping information and a color input that is a part of the display input.

9. The method of claim 6, wherein the configuring step includes storing a plurality of color mapping information entries in memory of the display system, wherein each of the color mapping information entries is generated based on the determined first device-to-independent color mapping, and wherein at least one of the color mapping information entries is generated based on the determined second device-to-independent color mapping.

10. The method of claim 9, wherein the display system includes the third electronic display, and wherein at least one of the color mapping information entries is generated based on color mappings other than the determined second device-to-independent color mapping.

11. The method of claim 1, wherein the first color matching sub-portion is color matched to the second electronic display by using a color matching function where color mapping information for the second electronic display and for the first electronic display is used by the color matching function to generate a color matched display input that is to be passed to the first electronic display for display.

12. The method of claim 1, wherein the configuring step includes storing, into memory of the display system, a first data structure representing the first device-to-independent color mapping and/or the second device-to-independent color mapping.

13. A display system, comprising:
    at least one processor and memory storing computer instructions accessible by the at least one processor;

wherein the at least one processor, when executing the computer instructions, causes the display system to carry out a process for color matching two or more electronic displays of a display system, wherein the process includes:
  receiving a display input;
  applying color matching to the display input using color mapping information to obtain a color matched display input; and
  causing the color matched display input to be displayed at a matching display,
wherein the color mapping information is obtained by a display configuration process that includes:
  obtaining first spectral response readings for a first electronic display and second spectral response readings for a second electronic display from one or more spectral response devices, wherein the first spectral response readings for the first electronic display are obtained from the one or more spectral response devices through use of a grayscale ramping technique that includes an iterative process having N iterations, where, for each iteration n of the total N iterations, the iterative process includes:
    displaying an image represented by a digital grayscale input $i_n$ at the first electronic display, and
    obtaining a spectral response reading using at least one of the spectral response devices,
    wherein, for a next iteration n+1, the digital grayscale input $i_{n+1}$ is obtained by increasing or decreasing input values evenly for each channel of a color set corresponding to the first electronic display relative to those input values used for the digital grayscale input $i_n$ for the current iteration n;
  determining a first spectral response curve based on the first spectral response readings and a second spectral response curve based on the second spectral response readings;
  determining a first spectral power distribution based on the first spectral response readings and a second spectral power distribution based on the second spectral response readings;
  determining a first device-to-independent color mapping that represents a mapping between the first color space and an independent color space, wherein the first device-to-independent color mapping is determined based on the first spectral response curve and the first spectral power distribution;
  determining a second device-to-independent color mapping that represents a mapping between the second color space and the independent color space, wherein the second device-to-independent color mapping is determined based on the second spectral response curve and the second spectral power distribution; and
  configuring a display system with the color mapping information so as to match colors being displayed, wherein the color mapping information is based on the first device-to-independent color mapping and the second device-to-independent color mapping.

14. The display system of claim 13, further comprising the first electronic display and the second electronic display, and wherein the first electronic display is a reference display and the second electronic display is the matching display.

15. The display system of claim 13, wherein the display system is an in-vehicle display system.

16. The display system of claim 15, wherein the display system is configured to operate a plurality of displays, and wherein at least two of the displays are different technologies.

17. The display system of claim 16, wherein the first electronic display is a display monitor and the second electronic display is a non-resolute display.

18. The display system of claim 15, wherein the in-vehicle display system is configured to obtain updated color mapping information from a backend server.

19. A method for color matching two or more electronic displays of a display system, comprising:
  obtaining first spectral response readings for a first electronic display from one or more spectral response devices, wherein the first spectral response readings for the first electronic display are obtained from the one or more spectral response devices through use of a grayscale ramping technique that includes an iterative process having N iterations, where, for each iteration n of the total N iterations, the iterative process includes:
    displaying an image represented by a digital grayscale input $i_n$ at the first electronic display, and
    obtaining a spectral response reading using at least one of the spectral response devices,
  wherein, for a next iteration n+1, the digital grayscale input $i_{n+1}$ is obtained by increasing or decreasing input values evenly for each channel of a color set corresponding to the first electronic display relative to those input values used for the digital grayscale input $i_n$ for the current iteration n;
    determining a first spectral response curve based on the first spectral response readings;
    determining a first spectral power distribution based on the first spectral response readings;
    determining a first device-to-independent color mapping that represents a mapping between the first color space and an independent color space, wherein the first device-to-independent color mapping is determined based on the first spectral response curve and the first spectral power distribution; and
    configuring a display system having the first electronic display to match colors being displayed based on using the first device-to-independent color mapping.

* * * * *